US010728932B2

(12) United States Patent
Ohta et al.

(10) Patent No.: US 10,728,932 B2
(45) Date of Patent: Jul. 28, 2020

(54) WIRELESS COMMUNICATIONS SYSTEM, BASE STATION, AND MOBILE STATION

(71) Applicant: FUJITSU LIMITED, Kawasaki-shi, Kanagawa (JP)

(72) Inventors: Yoshiaki Ohta, Yokohama (JP); Shinichiro Aikawa, Yokohama (JP); Takayoshi Ode, Yokohama (JP); Junichi Suga, Ota (JP); Ryuichi Takechi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/668,782

(22) Filed: Aug. 4, 2017

(65) Prior Publication Data

US 2017/0332422 A1 Nov. 16, 2017

Related U.S. Application Data

(63) Continuation of application No. PCT/JP2015/054893, filed on Feb. 20, 2015.

(51) Int. Cl.
*H04W 4/00* (2018.01)
*H04W 76/11* (2018.01)
(Continued)

(52) U.S. Cl.
CPC ........ *H04W 76/11* (2018.02); *H04W 72/1278* (2013.01); *H04W 28/0263* (2013.01);
(Continued)

(58) Field of Classification Search
CPC ............. H04W 28/02; H04W 28/0263; H04W 28/0268; H04W 28/085; H04W 72/1278;
(Continued)

(56) References Cited

U.S. PATENT DOCUMENTS 8,824,298 B2 * 9/2014 Gupta ................... H04W 48/06
370/235
8,948,137 B2 * 2/2015 Sachs ............... H04W 36/0016
370/332
(Continued)

FOREIGN PATENT DOCUMENTS

EP 2 709 418 A2 3/2014
EP 2 723 144 A1 4/2014
(Continued)

OTHER PUBLICATIONS

Ohta et al, Link Layer Structure for LTE-WLAN aggregation in LTE-Advanced and 5G network, IEEE, 6 pages, 2015.*
(Continued)

*Primary Examiner* — Frank Duong
(74) *Attorney, Agent, or Firm* — Myers Wolin, LLC

(57) ABSTRACT

A wireless communications system includes a base station configured to control a second wireless communication different from a first wireless communication by a control unit configured to control the first wireless communication; and a mobile station configured to be capable of performing data transmission between the mobile station and the base station, using one of the first wireless communication and the second wireless communication. When data is transmitted between the base station and the mobile station using the second wireless communication, a sender station among the base station and the mobile station performs transmission control of using an identifier of a bearer of the data transmitted to a receiver station among the base station and the mobile station and using correspondence information of the identifier and an access category that is QoS information in the second wireless communication to identify the access category of the data and transmit the data.

13 Claims, 28 Drawing Sheets

(51) Int. Cl.
*H04W 72/12* (2009.01)
*H04W 28/08* (2009.01)
*H04W 28/02* (2009.01)
*H04W 76/12* (2018.01)
*H04W 76/15* (2018.01)

(52) U.S. Cl.
CPC ...... *H04W 28/0268* (2013.01); *H04W 28/085* (2013.01); *H04W 76/12* (2018.02); *H04W 76/15* (2018.02)

(58) Field of Classification Search
CPC ... H04W 76/02; H04W 76/021; H04W 76/12; H04W 76/15
See application file for complete search history.

(56) References Cited

U.S. PATENT DOCUMENTS

| | | | |
|---|---|---|---|
| 9,036,473 B2* | 5/2015 | Himayat | H04N 21/2365 |
| | | | 370/231 |
| 9,155,006 B2* | 10/2015 | Lee | H04W 36/0005 |
| 9,294,926 B2* | 3/2016 | Pragada | H04W 16/14 |
| 9,578,647 B2* | 2/2017 | Touati | H04W 76/12 |
| 9,585,048 B2* | 2/2017 | Ozturk | H04W 28/0205 |
| 9,603,055 B2* | 3/2017 | Forssell | H04W 28/08 |
| 9,674,733 B2* | 6/2017 | Faccin | H04W 76/16 |
| 9,788,242 B2* | 10/2017 | Nuggehalli | H04W 36/0022 |
| 9,819,469 B2* | 11/2017 | Horn | H04L 5/0058 |
| 9,883,441 B2* | 1/2018 | Rinne | H04W 40/02 |
| 10,285,090 B2* | 5/2019 | Hou | H04W 28/0215 |
| 2013/0088983 A1 | 4/2013 | Pragada et al. | |
| 2014/0029527 A1 | 1/2014 | Okuda | |
| 2014/0029570 A1* | 1/2014 | Lee | H04W 36/28 |
| | | | 370/331 |
| 2014/0050086 A1* | 2/2014 | Himayat | H04B 7/0417 |
| | | | 370/230 |
| 2014/0079007 A1 | 3/2014 | Li et al. | |
| 2014/0148129 A1 | 5/2014 | Lundstrom | |
| 2014/0293970 A1* | 10/2014 | Damnjanovic | H04L 5/0044 |
| | | | 370/336 |
| 2014/0321376 A1* | 10/2014 | Damnjanovic | H04W 72/1215 |
| | | | 370/329 |
| 2014/0369198 A1 | 12/2014 | Rinne et al. | |
| 2014/0369329 A1* | 12/2014 | Lee | H04W 28/06 |
| | | | 370/338 |
| 2015/0003435 A1 | 1/2015 | Horn et al. | |
| 2015/0124601 A1* | 5/2015 | Li | H04W 28/08 |
| | | | 370/230 |
| 2015/0156774 A1* | 6/2015 | Urie | H04L 5/0044 |
| | | | 370/329 |
| 2015/0237535 A1 | 8/2015 | Aramoto | |
| 2016/0234124 A1* | 8/2016 | Tomici | H04W 28/24 |
| 2016/0234851 A1* | 8/2016 | Zhang | H04W 28/08 |
| 2016/0316393 A1* | 10/2016 | Pantelidou | H04W 24/10 |

FOREIGN PATENT DOCUMENTS

| | | |
|---|---|---|
| JP | 2014-027548 A | 2/2014 |
| JP | 2014-518044 A | 7/2014 |
| WO | 2012/121757 A1 | 9/2012 |
| WO | 2012/148482 A1 | 11/2012 |
| WO | 2013/000645 A1 | 1/2013 |
| WO | 2013/068787 A1 | 5/2013 |
| WO | 2013/171365 A1 | 11/2013 |
| WO | 2014/054610 A1 | 4/2014 |
| WO | 2014/092626 A1 | 6/2014 |
| WO | 2015/002767 A1 | 1/2015 |

OTHER PUBLICATIONS

Notification of Reasons for Refusal issued by the Japan Patent Office for corresponding Japanese Patent Application No. 2017-103936, dated Jul. 17, 2018, with an English translation.

3GPP TS 36.300 V12.1.0 , "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", Mar. 2014.
3GPP TS 36.211 V12.1.0, "3rd Generation Partnership Project; Technical Specification Group Radio Access Network; Evolved Universal Terrestrial Radio Access (E-UTRA); Physical channels and modulation (Release 12)", Mar. 2014.
3GPP TS 36.212 V12.0.0, "3rd Generation Partnership Project; Technical Specification Group Radio Access Network; Evolved Universal Terrestrial Radio Access (E-UTRA); Multiplexing and channel coding (Release 12)", Dec. 2013.
3GPP TS 36.213 V12.1.0, "3rd Generation Partnership Project; Technical Specification Group Radio Access Network; Evolved Universal Terrestrial Radio Access (E-UTRA); Physical layer procedures (Release 12)", Mar. 2014.
3GPP TS 36.321 V12.0.0, "3rd Generation Partnership Project; Technical Specification Group Radio Access Network; Evolved Universal Terrestrial Radio Access (E-UTRA); Medium Access Control (MAC) protocol specification (Release 12)", Dec. 2013.
3GPP TS 36.322 V11.0.0, "3rd Generation Partnership Project; Technical Specification Group Radio Access Network; Evolved Universal Terrestrial Radio Access (E-UTRA); Radio Link Control (RLC) protocol specification (Release 11)", Sep. 2012.
3GPP TS 36.323 V11.2.0, "3rd Generation Partnership Project; Technical Specification Group Radio Access Network; Evolved Universal Terrestrial Radio Access (E-UTRA); Packet Data Convergence Protocol (PDCP) specification (Release 11)", Mar. 2013.
3GPP TS 36.331 V12.0.0, "3rd Generation Partnership Project; Technical Specification Group Radio Access Network; Evolved Universal Terrestrial Radio Access (E-UTRA); Radio Resource Control (RRC); Protocol specification (Release 12)", Dec. 2013.
3GPP TS 36.413 V12.0.0, "3rd Generation Partnership Project; Technical Specification Group Radio Access Network; Evolved Universal Terrestrial Radio Access Network (E-UTRAN); S1 Application Protocol (S1AP) (Release 12)", Dec. 2013.
3GPP TS 36.423 V12.0.0, "3rd Generation Partnership Project; Technical Specification Group Radio Access Network; Evolved Universal Terrestrial Radio Access (E-UTRAN); X2 application protocol (X2AP) (Release 12)", Dec. 2013.
3GPP TR 36.842 V12.0.0, "3rd Generation Partnership Project; Technical Specification Group Radio Access Network; Study on Small Cell enhancements for E-UTRA and E-UTRAN; Higher layer aspects (Release 12)", Dec. 2013.
3GPP TR 37.834 V12.0.0, "3rd Generation Partnership Project; Technical Specification Group Radio Access Network; Study on Wireless Local Area Network (WLAN)—3GPP radio interworking (Release 12)", Dec. 2013.
3GPP TS 24.301 V12.6.0, "3rd Generation Partnership Project; Technical Specification Group Core Network and Terminals; Non-Access-Stratum (NAS) protocol for Evolved Packet System (EPS); Stage 3 (Release 12)", Sep. 2014.
3GPP TS 23.401 V13.1.0, "3rd Generation Partnership Project; Technical Specification Group Services and System Aspects; General Packet Radio Service (GPRS) enhancements for Evolved Universal Terrestrial Radio Access Network (E-UTRAN) access (Release 13)", Dec. 2014.
BlackBerry UK Limited, "On Integration of Unlicensed Spectrum", 3GPP workshop on LTE in unlicensed spectrum, RWS-140027, Jun. 19, 2014.
Intel Corporation, "Evolution of WLAN/3GPP radio interworking towards tight integration", Agenda Item: 14.1.2, TSG-RAN Meeting #63, RP-140237, Fukuoka, Japan, Mar. 3-6, 2014.
Intel Corporation et al., "New SI Proposal: LTE-WLAN Radio Level Integration", Agenda Item: 14.1.2, 3GPP TSG-RAN Meeting #66, RP-142281, Maui, USA, Dec. 8-11, 2014. revision of RP-yynnnn.
China Telecom, "Motivation for New SI: Network Controlled WLAN/3GPP Radio Interworking", Agenda Item: 14.1.2, 3GPP

(56) References Cited

OTHER PUBLICATIONS

TSG-RAN Meeting #65, RP-141361, Edinburgh, Scotland, Sep. 9-12, 2014.
International Search Report issued for corresponding International Patent Application No. PCT/JP2015/054893, dated May 19, 2015.
International Preliminary Report on Patentability for corresponding International Patent Application No. PCT/JP2015/054893, dated May 19, 2015, with an English translation.
Office Action and Examination Search Report issued by the Canadian Intellectual Property Office for corresponding Canadian Patent Application No. 2,976,880 dated Jun. 15, 2018.
Notice of Preliminary Rejection issued by the Korean Intellectual Property Office for corresponding Korean Patent Application No. 10-2017-7022803, dated Sep. 17, 2018, with English translation.
Extended European search report with supplementary European search report and the European search opinion issued by the European Patent Office for corresponding European Patent Application No. 15882662.8, dated Jan. 5, 2018.
Notification of Reasons for Refusal issued by the Japan Patent Office for corresponding Japanese Patent Application No. 2017-103936, dated Jan. 8, 2019. English translation attached.
Office Action issued by the Canadian Intellectual Property Office for corresponding Canadian Patent Application No. 2,976,880, dated Feb. 28, 2019.
Communication pursuant to Article 94(3) EPC issued by the European Patent Office for corresponding European Patent Application No. 15 882 662.8-1214, dated Apr. 1, 2019.
Examination Report (non-final Office Action) of Indian Patent Application 201737028784, dated Oct. 21, 2019, with full English translation.
Office Action issued by the Canadian Intellectual Property Office for corresponding Canadian Patent Application No. 2,976,880, dated Dec. 10, 2019.
First Notification of Office Action issued by the China National Intellectual Property Administration for corresponding Chinese Patent Application No. 201580076293.4, dated Apr. 8, 2020, with a partial English translation.

* cited by examiner

FIG.10

| FIRST 3 BITS (IP PRECEDENCE) | VALUE | SUPPLEMENT |
|---|---|---|
| 111 | NETWORK CONTROL | RESERVATION FOR CONTROL SUCH AS ROUTING |
| 110 | INTERNET CONTROL | RESERVATION FOR CONTROL SUCH AS ROUTING |
| 101 | CRITICAL | GENERAL USE |
| 100 | FLASH OVERWRITE | GENERAL USE |
| 011 | FLASH | GENERAL USE |
| 010 | IMMEDIATE | GENERAL USE |
| 001 | PRIORITY | GENERAL USE |
| 000 | ROUTINE | GENERAL USE |

PRIORITY LEVEL ←

| QCI | TYPE | PRIORITY | EXAMPLE | AC |
|---|---|---|---|---|
| 1 | GBR | 2 | CONVERSATIONAL VOICE | VO |
| 2 | GBR | 4 | CONVERSATIONAL VIDEO (LIVE STREAMING) | VI |
| 3 | GBR | 3 | REAL TIME GAMING | VI |
| 4 | GBR | 5 | NON-CONVERSATIONAL VIDEO (BUFFERED STREAMING) | VI |
| 65 | GBR | 0.7 | MISSION CRITICAL P to T VOICE | VO |
| 66 | GBR | 2 | NON-MISSION CRITICAL P to T VOICE | VO |
| 5 | NON-GBR | 1 | IMS SIGNALING | VO |
| 6 | NON-GBR | 6 | VIDEO (BUFFERED STREAM), TCP BASE APPLICATION | BE |
| 7 | NON-GBR | 7 | VOICE, VIDEO (LIVE STREAMING), INTERACTIVE GAMINING | BE |
| 8 | NON-GBR | 8 | VIDEO (BUFFERED STREAM), TCP BASE APPLICATION | BK |
| 9 | NON-GBR | 9 | VIDEO (BUFFERED STREAM), TCP BASE APPLICATION | BK |
| 69 | NON-GBR | 0.5 | MISSION CRITICAL DELAY SENSITIVE SIGNALING | VO |
| 70 | NON-GBR | 0.5 | MISSION CRITICAL DATA | VO |

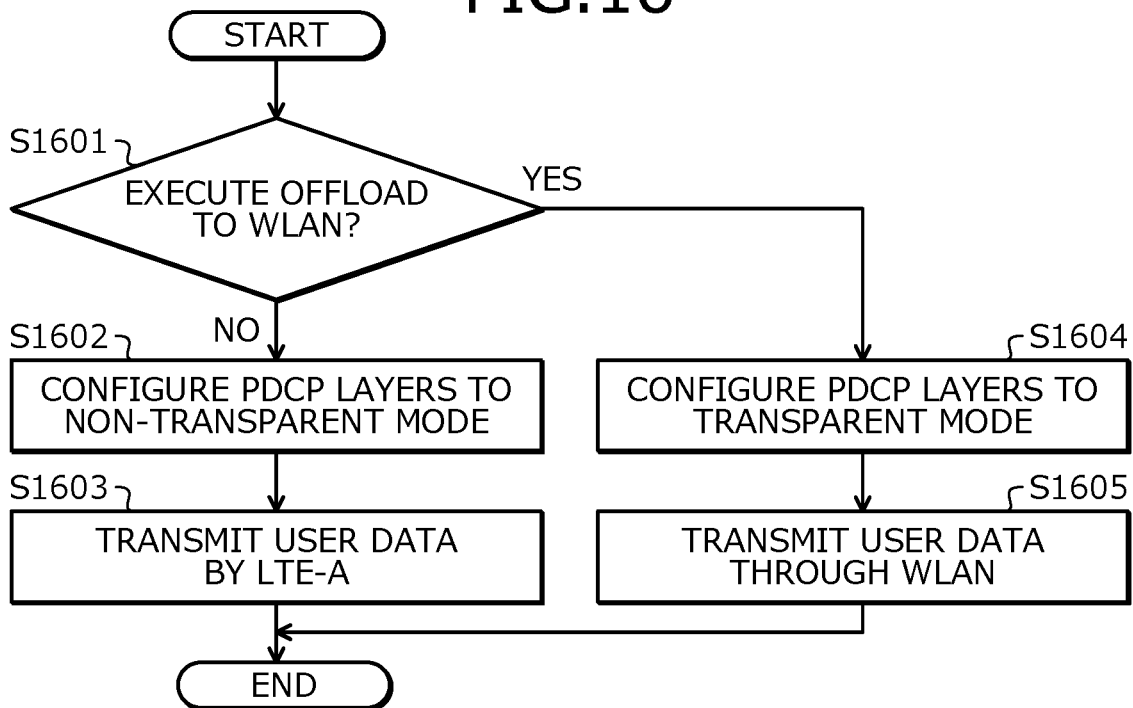

WIRELESS COMMUNICATIONS SYSTEM, BASE STATION, AND MOBILE STATION

CROSS REFERENCE TO RELATED APPLICATIONS

This application is a continuation application of International Application PCT/JP2015/054893, filed on Feb. 20, 2015, and designating the U.S., the entire contents of which are incorporated herein by reference.

FIELD

The embodiments discussed herein relate to a wireless communications system, a base station, and a mobile station.

BACKGROUND

Up until now, mobile communications such as long term evolution (LTE) have been known (for example, refer to 3GPP TS36.300 v12.1.0, March 2014; 3GPP TS36.211 v12.1.0, March 2014; 3GPP TS36.212 v12.0.0, December 2013; 3GPP TS36.213 v12.1.0, March 2014; 3GPP TS36.321 v12.0.0, December 2013; 3GPP TS36.322 v11.0.0, September 2012; 3GPP TS36.323 v11.2.0, March 2013; 3GPP TS36.331 v12.0.0, December 2013; 3GPP TS36.413 v12.0.0, December 2013; 3GPP TS36.423 v12.0.0, December 2013; 3GPP TR36.842 v12.0.0, December 2013; 3GPP TR37.834 v12.0.0, December 2013; 3GPP TS24.301 v12.6.0, September 2014; and 3GPP TS23.401 v13.1.0, December 2014). Under LTE, aggregation for communicative cooperation with a wireless local area network (WLAN) on a wireless access level is being studied (for example, refer to 3GPP RWS-140027, June 2014; 3GPP RP-140237, March 2014; and 3GPP RP-142281, December 2014).

A technique has also been known that transfers data from the radio resource control (RRC) layer to the media access control (MAC) layer when using WLAN (for example, refer to International Publication No. 2012/121757). Another technique has been known that shares LTE packet data convergence protocol (PDCP) between LTE and WLAN (for example, refer to International Publication No. 2013/068787). A further technique has been known that performs data transmission control on the basis of quality of service (QoS) information in WLAN, etc.

SUMMARY

According to an aspect of an embodiment, a wireless communications system includes a base station configured to control a second wireless communication different from a first wireless communication by a controller configured to control the first wireless communication; and a mobile station configured to be capable of performing data transmission between the mobile station and the base station, using one of the first wireless communication and the second wireless communication. When data is transmitted between the base station and the mobile station using the second wireless communication, a sender station among the base station and the mobile station performs transmission control by identifying an access category of a bearer by using an identifier of the bearer of the data transmitted to a receiver station that is the base station or the mobile station and mapping information between the identifier and the access category that is QoS information in the second wireless communication.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 10 is a diagram depicting an example of values of a ToS field included in an IP header of an IP packet transmitted in the wireless communications system according to the second embodiment;

FIG. 15 is a diagram depicting an example of mapping to QoS class ACs applicable to the wireless communications system according to the second embodiment;

FIG. 16 is a flowchart depicting an example of processing by a sender apparatus in the wireless communications system according to the second embodiment;

DESCRIPTION OF THE INVENTION

Embodiments of a communications system, a base station, and a mobile station according to the present invention will be described in detail with reference to the accompanying drawings.

Figure 1A:
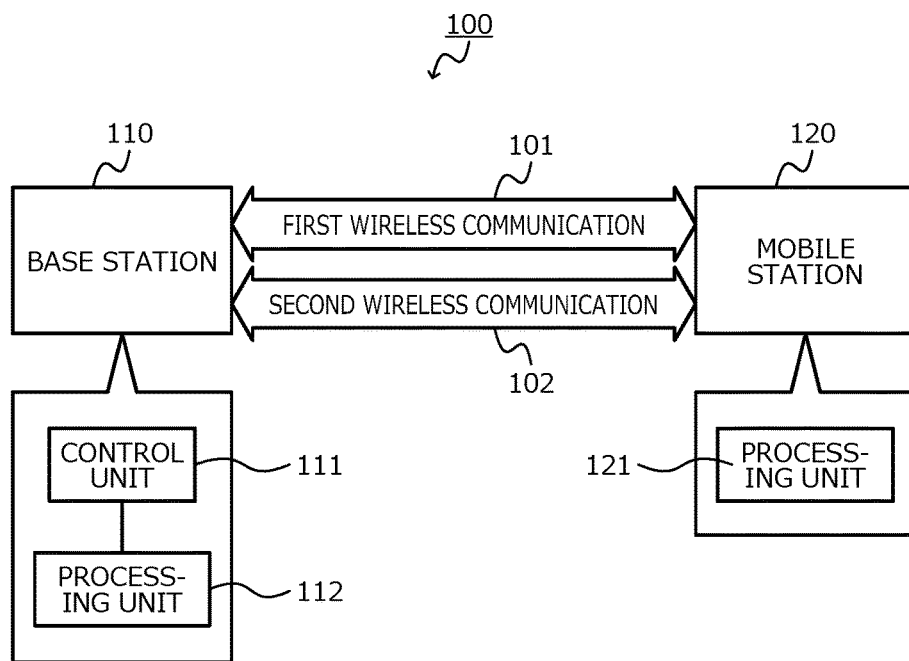
FIGS. 1A and 1B are diagrams depicting examples of a wireless communications system according to a first embodiment.
Figure 1B:
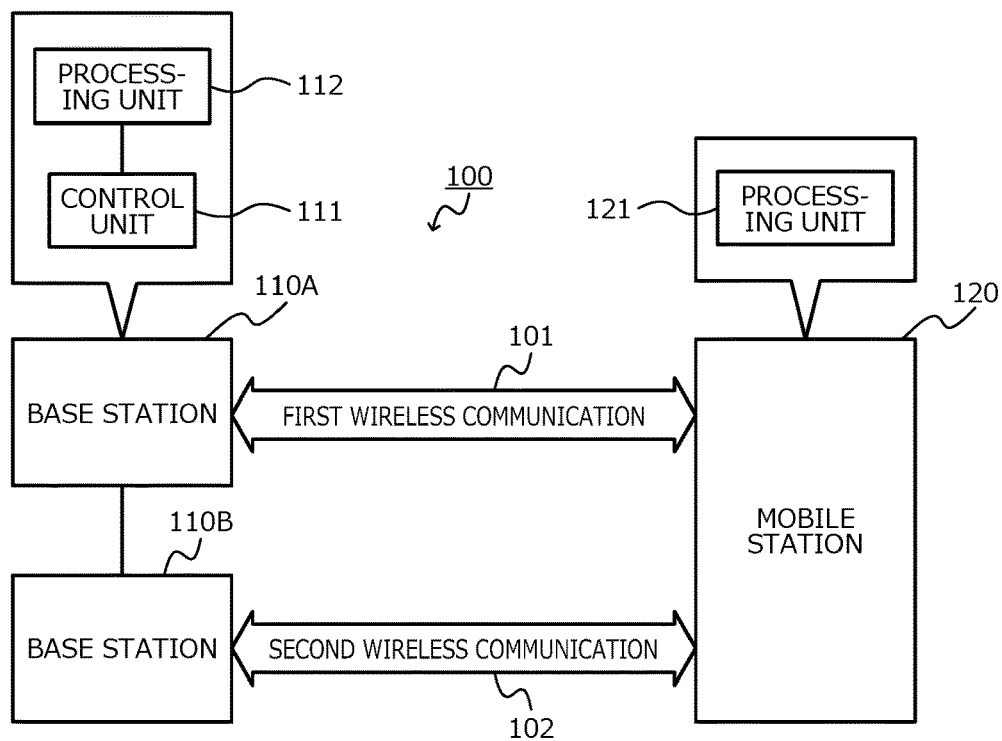

FIGS. 1A and 1B are diagrams depicting an example of a wireless communications system according to a first embodiment. As depicted in FIG. 1A, a wireless communications system 100 according to the first embodiment includes a base station 110 and a mobile station 120. The wireless communications system 100 is capable of data transmission between the base station 110 and the mobile station 120 using a first wireless communication 101 and data transmission using a second wireless communication 102.

The first wireless communication 101 and the second wireless communication 102 are different wireless communications (wireless communication schemes). For example, the first wireless communication 101 is a cellular communication such as LTE or LTE-A. For example, the second wireless communication 102 is a WLAN. Note that the first wireless communication 101 and the second wireless communication 102 can be various types of communications without limitation hereto. In the example depicted in FIG. 1A, the base station 110 is a base station capable of the first wireless communication 101 and the second wireless communication 102 between the base station 110 and the mobile station 120, for example.

When transmitting data by use of the first wireless communication 101 without using the second wireless communication 102, the base station 110 and the mobile station 120 configure therebetween a communication channel of the wireless communication 101 for transmission of data of the first wireless communication 101. The base station 110 and the mobile station 120 transmit data by the communication channel configured for the first wireless communication 101.

When transmitting data by use of the second wireless communication 102, the base station 110 and the mobile station 120 configure therebetween a communication channel of the wireless communication 102 for transmission of data of the first wireless communication 101. The base station 110 and the mobile station 120 transmit data by the communication channel configured for the second wireless communication 102.

A downlink for transmitting data from the base station 110 to the mobile station 120 will first be described. The base station 110 includes a control unit 111 and a processing unit 112. The control unit 111 provides control for the first wireless communication 101. The control unit 111 provides control for the second wireless communication 102. For example, the control unit 111 is a processing unit such as an RRC that performs wireless control between the base station 110 and the mobile station 120. It is to be noted that the control unit 111 is not limited to the RRC and can be any type of processing unit that provides control for the first wireless communication 101.

The processing unit 112 performs processing for performing the first wireless communication 101. For example, the processing unit 112 is a processing unit for a data link layer, such as PDCP, radio link control (RLC), and MAC. It should be understood that the processing unit 112 is not limited to those above and can be any type of processing unit for performing the first wireless communication 101.

Processing of the processing unit 112 for performing the first wireless communication 101 is controlled by the control unit 111. When data is transmitted from the base station 110 to the mobile station 120 using wireless communication via the second wireless communication 102, the processing unit 112 establishes a convergence point for performing the first wireless communication 101. This convergence point is used in selecting the first wireless communication 101 and/or the second wireless communication 102 (confirming the presence or absence of an offload described later) for data transmitted between the base station 110 and the mobile station 120. The convergence point may be designated as an end point, a branch point, a split function, or a routing function. Such a designation is not limiting provided it means a data scheduling point between the first wireless communication and the second wireless communication. Hereinafter, the convergence point is used as one such general designation.

At the established convergence point, the processing unit 112 renders transparent the quality of service information included in data transmitted to the mobile station 120 and transmits the data to the mobile station 120. The quality of service information is, for example, information indicating the priority of transmission such as a service class of data. For example, the quality of service information is QoS information such as a type of service (ToS) field included in a data header. It should be appreciated that the quality of service information is not limited hereto and can be any type of information indicating priority for data transmission. In a virtual local area network (VLAN) for example, a VLAN tag has a field defining QoS therein. More generally, QoS information is 5-tuple information. 5-tuple refers to source IP address and port number, destination IP address and port number, and protocol type.

For example, when data is transmitted from the base station 110 to the mobile station 120 via the first wireless communication 101 without using the second wireless communication 102, the processing unit 112 performs predetermined processing for transmission data. The predetermined processing is, for example, processing for prohibiting the processing of the second wireless communication 102 from referring to the quality of service information included in the transmission data. For example, the predetermined processing is processing that includes at least one of ciphering, header compression, and addition of sequence number. For example, the predetermined processing is processing of PDCP. It should be noted that the predetermined processing is not limited hereto and can be any type of processing for prohibiting reference of the quality of service information in the processing of the second wireless communication 102.

When transmitting data to the mobile station 120 using the second wireless communication 102, the processing unit 112 does not perform the abovementioned processing that prohibits the processing of the second wireless communication 102 from referring to the quality of service information included in the transmission data. This enables the quality of service information to be referred to in the processing of the second wireless communication 102, for data transmitted using the second wireless communication 102. Thus, for data to be transmitted, transmission control based on the quality of service information in the processing of the second wireless communication 102 becomes possible. Transmission control based on the quality of service information is, for example, QoS control that controls the transmission priority in accordance with the quality of service information. Note that the transmission control based on the quality of service information is not limited hereto and can be any type of control.

The mobile station 120 receives data transmitted from the base station 110, by the first wireless communication 101 and/or the second wireless communication 102. In this manner, data from the base station 110 to the mobile station 120 is transmitted in a distributed manner between the first wireless communication 101 and the second wireless communication 102, so that data transmission efficiency can be improved.

An uplink for transmitting data from the mobile station 120 to the base station 110 will be described next. The mobile station 120 includes a processing unit 121. Similar to the processing unit 112 of the base station 110, the processing unit 121 is a processing unit for performing the first wireless communication 101. For example, the processing unit 121 is a processing unit for a data link layer, such as PDCP, RLC, and MAC. It should be understood that the processing unit 121 is not limited to the ones above and can be any type of processing unit for performing the first wireless communication 101.

Processing by the processing unit 121 for performing the first wireless communication 101 is controlled by the control unit 111 of the base station 110. When data is transmitted from the mobile station 120 to the base station 110 using wireless communication via the second wireless communication 102, the processing unit 121 establishes a convergence point for performing the first wireless communication 101. As described above, this convergence point is used in selecting the first wireless communication 101 and/or the second wireless communication 102 (confirming the presence or absence of the offload described later) for data transmitted between the base station 110 and the mobile station 120, and may be designated as an end point or a branch point.

At the established convergence point, the processing unit 121 renders transparent the quality of service information included in data transmitted to the mobile station 120 and transmits the data to the base station 110. The quality of service information is, for example, information indicating priority of transmission such as the service class of data, for example, as described above.

For example, when data is transmitted from the mobile station 120 to the base station 110 by the first wireless communication 101 without using the second wireless communication 102, the processing unit 121 performs predetermined processing for transmission data. The predetermined processing is processing for making reference to the quality of service information included the transmission data impossible in the processing of the second wireless communication 102.

When transmitting data to the base station 110 using the second wireless communication 102, the processing unit 121 does not perform the above predetermined processing for transmission data. The above predetermined processing is processing for making reference to the quality of service information included the transmission data impossible in the processing of the second wireless communication 102. This enables the quality of service information to be referred to in the processing of the second wireless communication 102, for data transmitted using the second wireless communication 102. Thus, for data to be transmitted, transmission control based on the quality of service information in the processing of the second wireless communication 102 becomes possible. The transmission control based on the quality of service information is, for example, QoS control that controls the transmission priority in accordance with the quality of service information, as described above.

The base station 110 receives data transmitted from the mobile station 120, by use of the first wireless communication 101 and/or the second wireless communication 102. In this manner, data from the mobile station 120 to the base station 110 is transmitted in a distributed manner between the first wireless communication 101 and the second wireless communication 102, so that data transmission efficiency may be improved.

In this manner, the source-side station among the base station 110 and the mobile station 120 renders transparent the quality of service information at the processing unit of the first wireless communication 101 when data is transmitted using the second wireless communication 102 under control from the control unit 111 of the first wireless communication 101.

Thus, the source-side station among the base station 110 and the mobile station 120 becomes capable of transmission control in accordance with the quality of service information in the data transmission processing of data in the second wireless communication 102. By using the second wireless communication 102, it is therefore possible to suppress decreases in communication quality attributable to data transmission or to maintain the communication quality.

In FIG. 1A, although a case has been described where the base station 110 is a base station capable of the first wireless communication 101 and the second wireless communication 102 with the mobile station 120, base stations 110A and 110B may be replaced with the base station 110, as depicted in FIG. 1B. The base station 110A is a base station capable of the first wireless communication 101 with the mobile station 120. The base station 110B is a base station connected to the base station 110A and a base station capable of the second wireless communication 102 with the mobile station 120.

In the example depicted in FIG. 1B, the base station 110A transmits data via the base station 110B in a case of performing data transmission by using the wireless communication 102 between the base station 110A and the mobile station 120. In this case, the control unit 111 and the processing unit 112 depicted in FIG. 1A are equipped in the base station 110A for example. The control unit 111 provides control of the second wireless communication 102 with the mobile station 120 via the base station 110B.

A downlink for transmitting data from the base station 110A to the mobile station 120 will first be described. In the downlink, at the established convergence point, the processing unit 112 of the base station 110A renders transparent the quality of service information included in data transmitted to the mobile station 120 and transfers the data to the base station 110B, thereby transmitting the data to the mobile station 120 via the base station 110B. The base station 110B transmits data transferred from the base station 110A to the mobile station 120 via the second wireless communication 102.

An uplink for transmitting data from the mobile station 120 to the base station 110A will be described next. Processing of the processing unit 121 of the mobile station 120 is controlled by the control unit 111 of the base station 110A. At the established convergence point, the processing unit 121 renders transparent the quality of service information included in data to the base station 110A and transmits the data to the base station 110B via the second wireless communication 102. The base station 110B transfers to the base station 110A, the data transmitted from the mobile station 120 via the second wireless communication 102. This enables data to the base station 110A to be transmitted to the base station 110A using the wireless communication 102.

In this manner, the source-side station among the base station 110A and the mobile station 120 renders transparent the quality of service information at the processing unit of the first wireless communication 101 when data is transmitted using the second wireless communication 102 under the control from the control unit 111 of the first wireless communication 101.

Thus, in the downlink, the base station 110B becomes capable of transmission control in accordance with the quality of service information in the data transmission processing through the second wireless communication 102. In the uplink, the mobile station 120 becomes capable of transmission control in accordance with the quality of service information in the data transmission processing through the second wireless communication 102. It is therefore possible to suppress decreases in communication quality attributable to data transmission using the second wireless communication 102 or to maintain the communication quality.

According to the first embodiment, decreases in the communication quality can be suppressed or the communication quality can be maintained.

Details of the wireless communications system 100 according to the first embodiment depicted in FIG. 1 will be described using second and third embodiments. The second and third embodiments can be regarded as examples obtained by embodying the above first embodiment and hence, can naturally be carried out in combination with the first embodiment.

Figure 2:
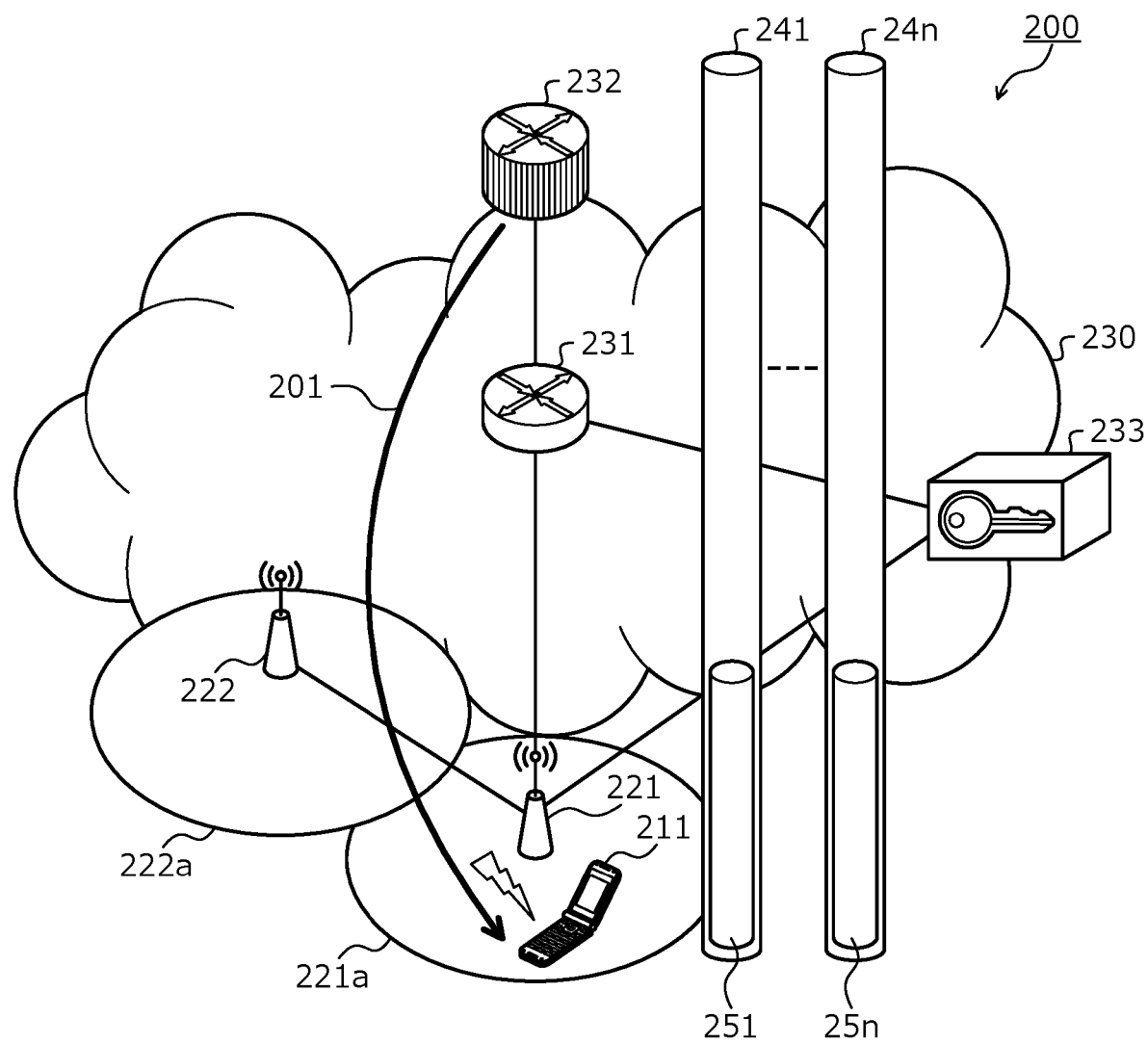
FIG. 2 is a diagram depicting an example of the wireless communications system according to a second embodiment.

FIG. 2 is a diagram depicting an example of a wireless communications system according to the second embodiment. As depicted in FIG. 2, a wireless communications system 200 according to the second embodiment includes a UE 211, eNBs 221, 222, and a packet core network 230. The wireless communications system 200 is a mobile communications system such as LTE-A defined by 3GPP, for example. Nonetheless, the communication standard of the wireless communications system 200 is not limited hereto.

For example, the packet core network 230 is an evolved packet core (EPC) defined under 3GPP, but is not particularly limited hereto. Note that the core network defined by 3GPP may be called system architecture evolution (SAE). The packet core network 230 includes an SGW 231, a PGW 232, and an MME 233.

The UE 211 and the eNBs 221, 222 form a wireless access network by performing wireless communication. The wireless access network formed by the UE 211 and the eNBs 221, 222 is, for example, an evolved universal terrestrial radio access network (E-UTRAN) defined by 3GPP, but is not particularly limited hereto.

The UE 211 is a terminal located within a cell of the eNB 221 and performs wireless communication with the eNB 221. For example, the UE 211 performs communication with another communication device through the eNB 221, SGW 231 and the SGW232. For example, another communication device performing communication with the UE 211 is a communication terminal different from the UE 211, or is a server, etc. Communication between the UE 211 and another communication device is, for example, data communication or audio communication, but is not particularly limited hereto. Audio communication is, for example, voice over LTE (VoLTE), but is not particularly limited hereto.

The eNB 221 is a base station forming a cell 221a and performing wireless communication with the UE 211 located within the cell 221a. The eNB 221 relays communication between the UE 211 and the SGW 231. The eNB 222 is a base station that forms a cell 222a and performs wireless communication with a UE located within the cell 222a. The eNB 222 relays communication between the UE located within the cell 222a and the SGW 231.

The eNB 221 and the eNB 222 may be connected to each other via a physical or logical interface between base stations, for example. The interface between base stations is, for example, an X2 interface, but is not particularly limited hereto. The eNB 221 and the SGW 231 are connected to each other via a physical or logical interface, for example. The interface between the eNB 221 and the SGW 231 is, for example, an S1-U interface, but is not particularly limited hereto.

The SGW 231 is a serving gateway accommodating the eNB 221 and performing user plane (U-plane) processing in communication via the eNB 221. For example, the SGW 231 performs the U-plane processing in communication of the UE 211. The U-plane is a function group performing user data (packet data) transmission. The SGW 231 may accommodate the eNB 222 to perform the U-plane processing in communication via the eNB 222.

The PGW 232 is a packet data network gateway for connection to an external network. The external network is the Internet, for example, but is not particularly limited hereto. For example, the PGW 232 relays user data between the SGW 231 and the external network. For example, to allow the UE 211 to transmit or receive an IP flow, the PGW 232 performs an IP address allocation 201 for allocating an IP address to the UE 211.

The SGW 231 and the PGW 232 are connected to each other via a physical or logical interface, for example. The interface between the SGW 231 and the PGW 232 is an S5 interface, for example, but is not particularly limited hereto.

The MME (mobility management entity) 233 accommodates the eNB 221 and performs control plane (C-plane) processing in communication via the eNB 221. For example, the MME 233 performs C-plane processing in communication of the UE 211 via the eNB 221. The C-plane is, for example, a function group for controlling a call or a network between devices. For example, the C-plane is used in connection of a packet call, configuration of a path for user data transmission, handover control, etc. The MME 233 may accommodate the eNB 222 and perform C-plane processing in communication via the eNB 222.

The MME 233 and the eNB 221 are connected to each other via a physical or logical interface, for example. The interface between the MME 233 and the eNB 221 is an S1-MME interface, for example, but is not particularly limited thereto. The MME 233 and the SGW 231 are connected to each other via a physical or logical interface for example. The interface between the MME 233 and the SGW 231 is an S11 interface as an example, but is not particularly limited hereto.

In the wireless communications system 200, an IP flow transmitted from or received by the UE 211 is classified into (allocated to) EPS bearers 241 to 24n and is transmitted via the PGW232 and the SGW231. The EPS bearers 241 to 24n are the IP flow in an evolved packet system (EPS). The EPS bearers 241 to 24n are in the form of radio bearers 251 to 25n in the wireless access network formed by the UE 211 and the eNB 221, 222. Overall communication control such as configuration of the EPS bearers 241 to 24n, security configuration, and mobility management is provided by the MME 233.

The IP flow classified into the EPS bearers 241 to 24n is transmitted through a GPRS tunneling protocol (GTP) tunnel configured between nodes for example in an LTE network. The EPS bearers 241 to 24n are uniquely mapped to radio bearers 251 to 25n, respectively, for wireless transmission that takes QoS into account.

In the communication between the UE 211 and the eNB 221 of the wireless communications system 200, an LTE-A and WLAN aggregation is carried out to offload LTE-A traffic to WLAN. This enables the traffic between the UE 211 and the eNB 221 to be distributed to LTE-A and WLAN, to achieve an improvement in throughput in the wireless communications system 200. The first wireless communication 101 depicted in FIG. 1 can be LTE-A wireless communication, for example. The second wireless communication 102 depicted in FIG. 1 can be WLAN wireless communication, for example. The LTE-A and WLAN aggregation will be described later.

It is to be understood that the designation of aggregation is merely an example and is often used to mean use of plural communication frequencies (carriers). Other than aggregation, integration is often used as a designation to mean different systems are integrated for plural use. Hereinafter, aggregation is used as a general designation.

The base station 110 depicted in FIG. 1 can be implemented by the eNBs 221, 222, for example. The mobile station 120 depicted in FIG. 1 can be implemented by the UE 211, for example.

Figure 3:
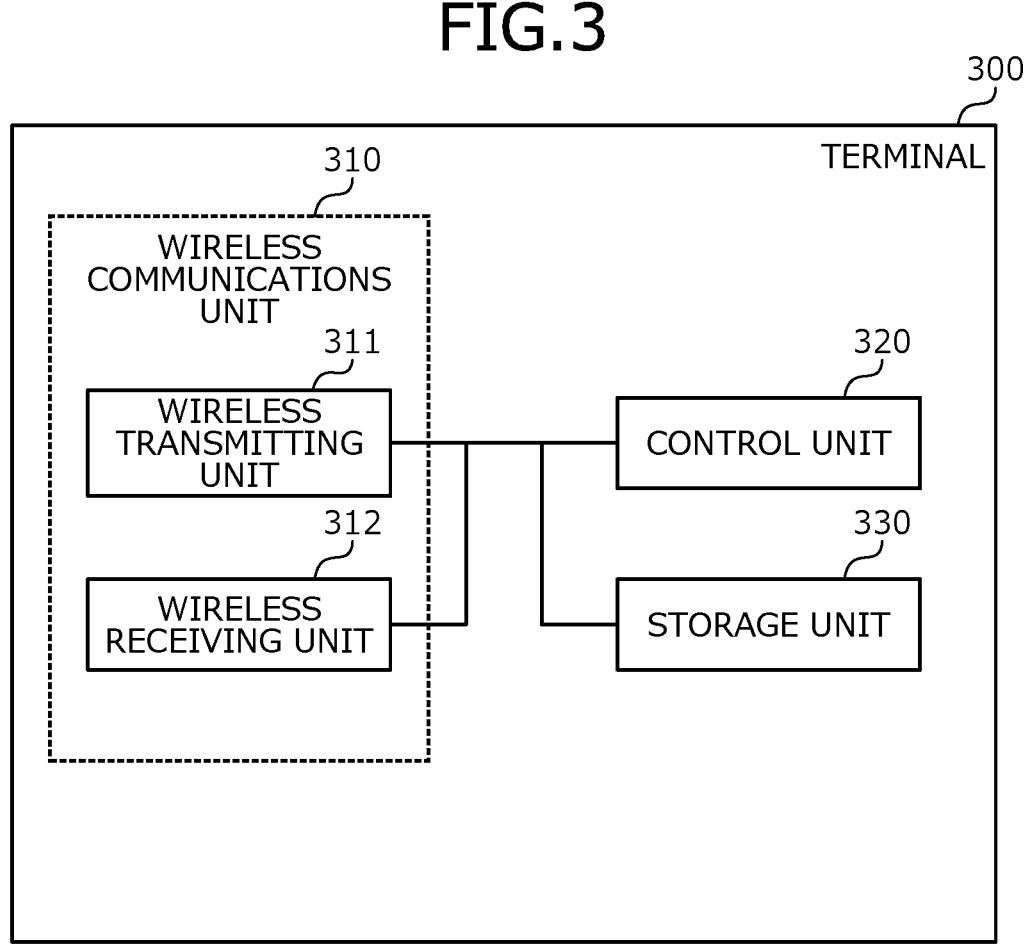
FIG. 3 is a diagram depicting an example of a terminal according to the second embodiment.

FIG. 3 is a diagram depicting an example of the terminal according to the second embodiment. The UE 211 depicted in FIG. 2 can be implemented by a terminal 300 depicted in FIG. 3, for example. The terminal 300 includes a wireless communications unit 310, a control unit 320, and a storage unit 330. The wireless communications unit 310 includes a wireless transmitting unit 311 and a wireless receiving unit 312. These units are connected to one another so as to enable unidirectional or bidirectional input or output of signals or data. The wireless communications unit 310 is capable of, for example, LTE-A wireless communication (the first wireless communication 101) and WLAN wireless communication (the second wireless communication 102).

The wireless transmitting unit 311 transmits user data or a control signal through wireless communication via an antenna. A wireless signal transmitted from the wireless transmitting unit 311 can include any user data, control information, etc. (that has been encoded, modulated, etc.). The wireless receiving unit 312 receives the user data or the control signal through wireless communication via an antenna. The wireless signal received by the wireless receiving unit 312 can include any user data, control information, etc. (that has been encoded, modulated, etc.). A common antenna may be used for transmitting and receiving.

The control unit 320 outputs to the wireless transmitting unit 311, user data, a control signal, etc. to be sent to another wireless station. The control unit 320 acquires the user data, the control signal, etc. received by the wireless receiving unit 312. The control unit 320 inputs/outputs user data, control information, a program, etc. from/to the storage unit 330 described later. The control unit 320 inputs/outputs user data, a control signal, etc. sent from or received by another communication device, etc., from/to a communications unit described later. In addition to the above, the control unit 320 provides various types of control in the terminal 300. The storage unit 330 stores various types of information such as user data, control information, and a program.

The processing unit 121 of the mobile station 120 depicted in FIG. 1 can be implemented by the control unit 320, for example.

Figure 4:
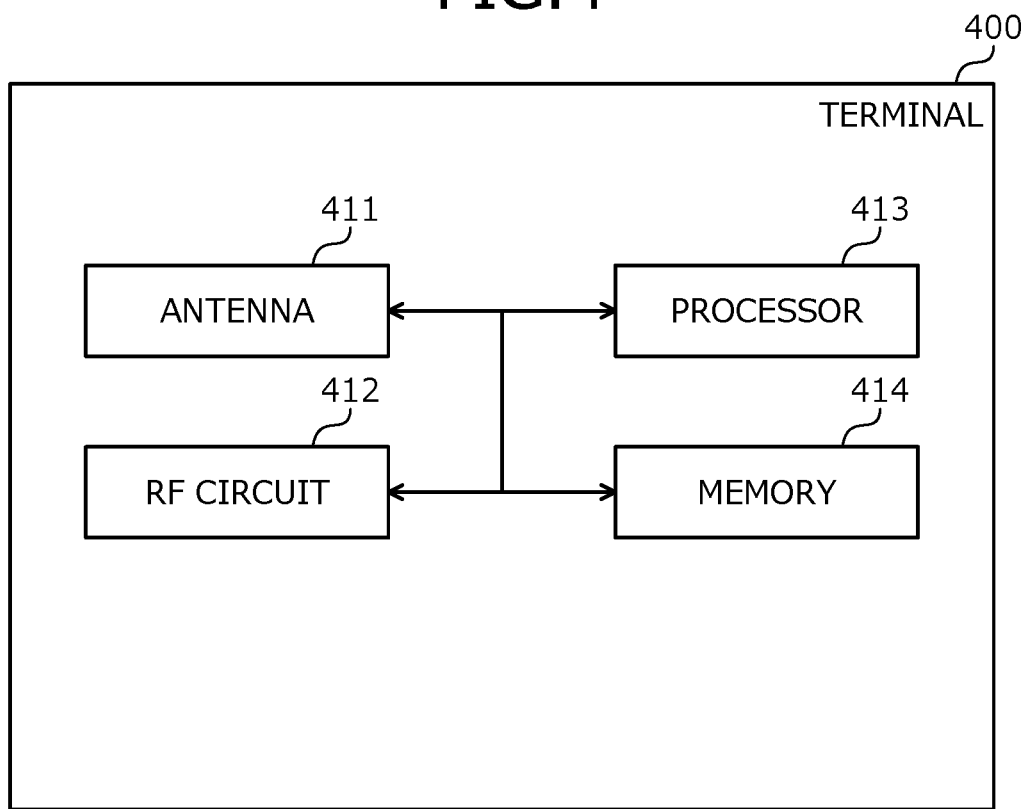
FIG. 4 is a diagram depicting an example of a hardware configuration of the terminal according to the second embodiment.

FIG. 4 is a diagram depicting an example of a hardware configuration of the terminal according to the second embodiment. The terminal 300 depicted in FIG. 3 can be implemented by a terminal 400 depicted in FIG. 4, for example. The terminal 400 includes, for example, an antenna 411, an RF circuit 412, a processor 413, and a memory 414. These components are connected to one another so as to enable input/output of various signals or data via a bus, for example.

The antenna 411 includes a transmitting antenna that transmits a wireless signal and a receiving antenna that receives a wireless signal. The antenna 411 may be a common antenna that sends and receives a wireless signal. The RF circuit 412 performs radio frequency (RF) processing on a signal received by or sent from the antenna 411. The RF processing includes, for example, frequency conversion between a baseband and a RF band.

The processor 413 is, for example, a central processing unit (CPU) or a digital signal processor (DSP). The processor 413 may be implemented by a digital electronic circuit such as an application specific integrated circuit (ASIC), a field programmable gate array (FPGA), and a large scale integration (LSI).

The memory 414 can be implemented, for example, by a random access memory (RAM) such as a synchronous dynamic random access memory (SDRAM), a read only memory (ROM), or a flash memory. The memory 414 stores user data, control information, a program, etc., for example.

The wireless communications unit 310 depicted in FIG. 3 can be implemented by the antenna 411 and the RF circuit 412, for example. The control unit 320 depicted in FIG. 3 can be implemented by the processor 413, for example. The storage unit 330 depicted in FIG. 3 can be implemented by the memory 414, for example.

Figure 5:
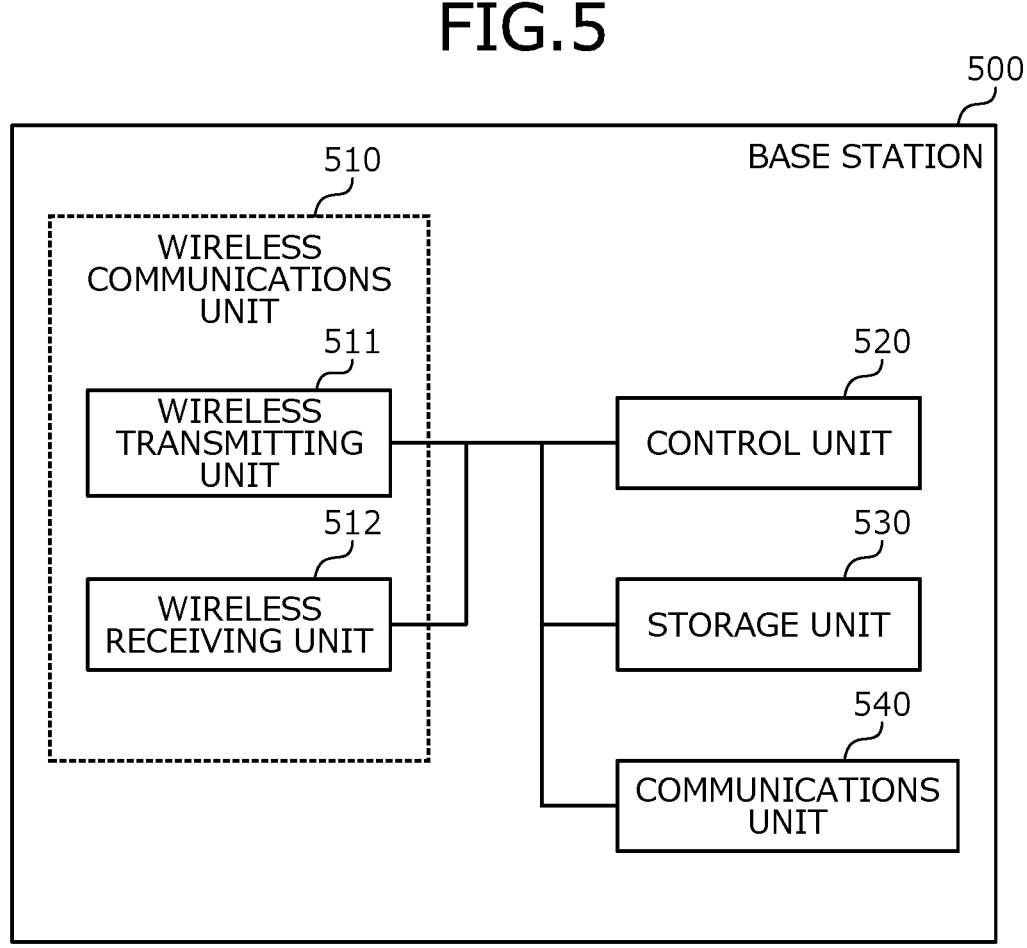
FIG. 5 is a diagram depicting an example of a base station according to the second embodiment.

FIG. 5 is a diagram depicting an example of the base station according to the second embodiment. The eNBs 221, 222 can each be implemented by a base station 500 depicted in FIG. 5, for example. As depicted in FIG. 5, the base station 500 includes, for example, a wireless communications unit 510, a control unit 520, a storage unit 530, and a communications unit 540. The wireless communications unit 510 includes a wireless transmitting unit 511 and a wireless receiving unit 512. These units are connected to one another so as to enable a unidirectional or bidirectional input or output of signals or data. The wireless communications unit 510 is capable of, for example, LTE-A wireless communication (the first wireless communication 101) and WLAN wireless communication (the second wireless communication 102).

The wireless transmitting unit 511 transmits user data, a control signal, etc. through wireless communication via an antenna. A wireless signal sent from the wireless transmitting unit 511 can include any user data, control information, etc. (that has been encoded, modulated, etc.). The wireless receiving unit 512 receives the user data the control signal, etc. through wireless communication via an antenna. The wireless signal received by the wireless receiving unit 512 can include any user data, control information, etc. (that has been encoded, modulated, etc.). A common antenna may be used for transmitting and receiving.

The control unit 520 outputs to the wireless transmitting unit 511, user data, a control signal, etc. to be sent to another wireless station. The control unit 320 acquires the user data, the control signal, etc. received by the wireless receiving unit 512. The control unit 520 inputs/outputs user data, control information, a program, etc. from/to the storage unit 530 described later. The control unit 520 inputs/outputs user data, a control signal, etc. transmitted from or received by another communication device, etc., from/to the communications unit 540 described later. In addition to the above, the control unit 520 provides various types of control in the base station 500.

The storage unit 530 stores various types of information such as user data, control information, and a program. With respect to another communication device, the communications unit 540 transmits/receives user data, a control signal, etc. by a wired signal, for example.

The control unit 111 and the processing unit 112 of the base station 110 depicted in FIG. 1 can be implemented by the control unit 520, for example.

Figure 6:
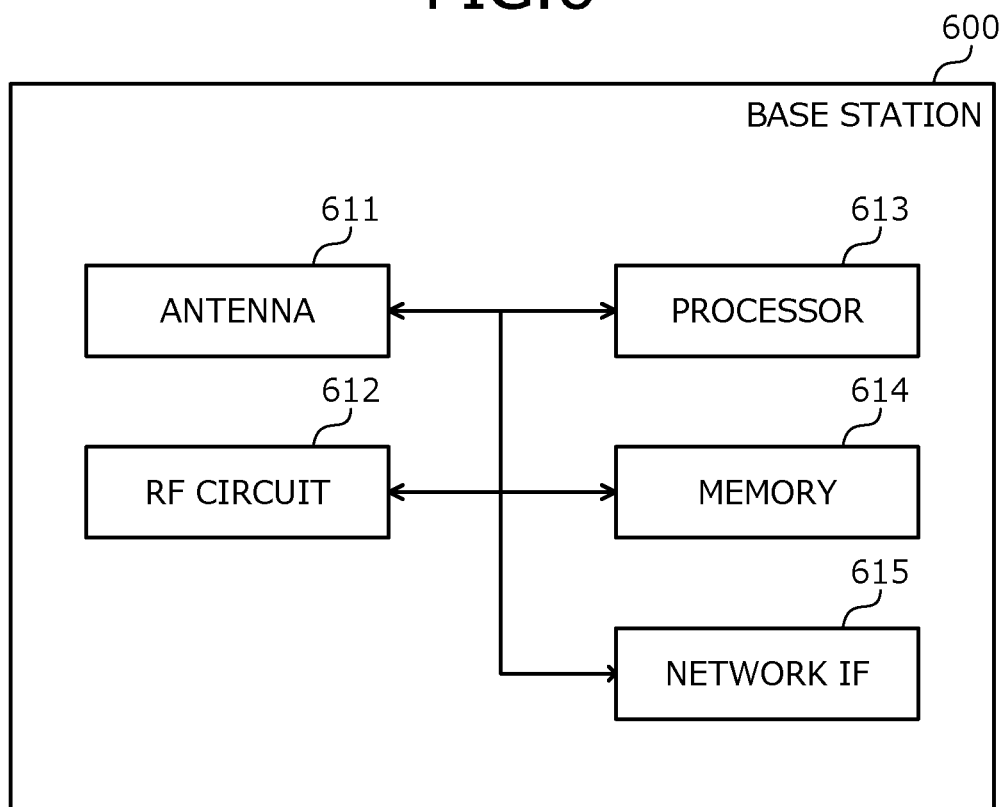
FIG. 6 is a diagram depicting an example of a hardware configuration of the base station according to the second embodiment.

FIG. 6 is a diagram depicting an example of a hardware configuration of the base station according to the second embodiment. The base station 500 depicted in FIG. 5 may be implemented by a base station 600 depicted in FIG. 6, for example. The base station 600 includes an antenna 611, an RF circuit 612, a processor 613, a memory 614, and a network IF 615. These components are connected to one another so as to enable input/output of various signals, data, etc. via a bus, for example.

The antenna 611 includes a transmitting antenna that transmits a wireless signal and a receiving antenna that receives a wireless signal. The antenna 611 may be a common antenna that transmits and receives wireless signals. The RF circuit 612 performs RF processing on a signal received by or transmitted from the antenna 611. The RF processing includes, for example, frequency conversion between a baseband and a RF band.

The processor 613 is, for example, the CPU or the DSP. The processor 613 may be implemented by the digital electronic circuit such as ASIC, FPGA, and LSI.

The memory 614 can be implemented by, for example, RAM such as SDRAM, ROM, or the flash memory. The memory 614 stores user data, control information, a program, etc., for example.

The network IF 615 is, for example, a communication interface performing wired communication with a network. The network IF 615 may include an Xn interface for performing wired communication between base stations, for example.

The wireless communications unit 510 depicted in FIG. 5 can be implemented by the antenna 611 and the RF circuit 612, for example. The control unit 520 depicted in FIG. 5 can be implemented by the processor 613, for example. The storage unit 530 depicted in FIG. 5 can be implemented by the memory 614, for example. The communications unit 540 depicted in FIG. 5 may be implemented by the network IF 615, for example.

Figure 7:
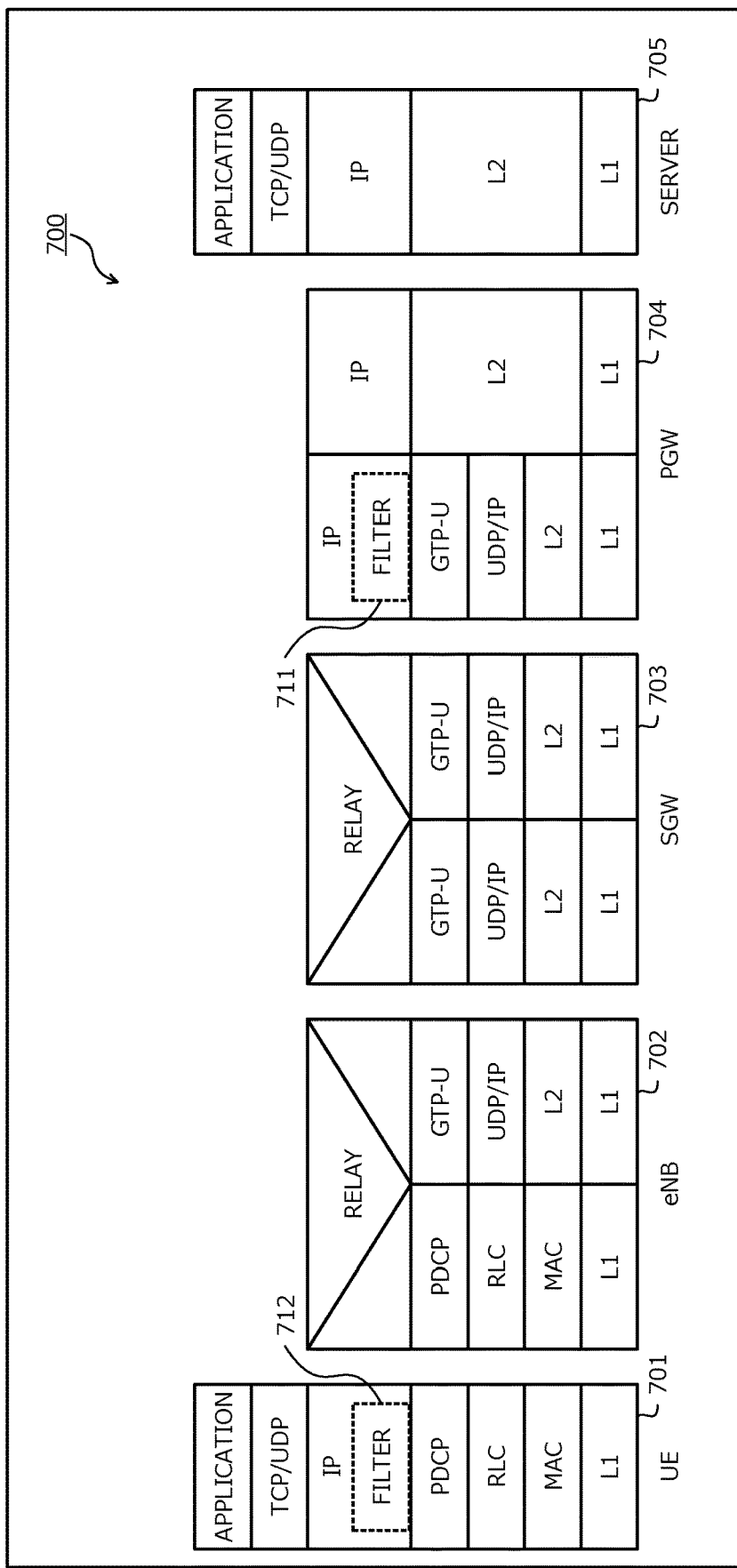
FIG. 7 is a diagram depicting an example of a protocol stack in the wireless communications system according to the second embodiment.

FIG. 7 is a diagram depicting an example of a protocol stack in the wireless communications system according to the second embodiment. A protocol stack 700 depicted in FIG. 7, for example, can be applied to the wireless communications system 200 according to the second embodiment. The protocol stack 700 is an LTE-A protocol stack defined under 3GPP. Layer groups 701 to 705 are layer groups showing respective processes at the UE 211, eNB 221, SGW 231, PGW 232, and an external network server, respectively.

In the case of transmitting an IP flow in the wireless communications system 200, IP flow filtering is carried out to handle each IP flow in accordance with the QoS class. For example, concerning a downlink where the UE 211 receives an IP flow, the PGW 232 performs packet filtering with respect to the IP flow and classifies the IP flow into EPS bearers 241 to 24n.

Concerning an uplink where the UE 211 transmits an IP flow, the PGW 232 notifies the UE 211 of a packet filtering rule. On the basis of the filtering rule notified from the PGW 232, the UE 211 applies packet filtering to the IP flow and classifies the IP flow into the EPS bearers 241 to 24n.

For example, in the uplink, the PGW 232 performs IP flow filtering by a filter layer (Filter) 711 included in an IP layer (IP) among a layer group 704 of the PGW 232. In the downlink, the UE 211 performs IP flow filtering by a filter layer (Filter) 712 included in an IP layer (IP) among a layer group 701 of the UE 211.

To allow a router in the LTE network to provide QoS control (QoS management), the PGW 232 (case of downlink) or the UE 211 (case of uplink) configures a QoS value in a ToS field of an IP packet header.

The packet filtering by the PGW 232 or the UE 211 is performed utilizing, e.g., a 5-tuple (source/destination IP addresses, source/destination port numbers, and protocol type). The filtering rule in the packet filtering is called a traffic flow template (TFT), for example. Some of the EPS bearers 241 to 24n may not have a TFT configured therefor.

When the IP flow filtering is carried out using TFT, the IP flow can be classified into at most 11 different EPS bearers. One bearer among the EPS bearers 241 to 24n is called default bearer. The default bearer is generated when the PGW 232 allocates an IP address to the UE 211, and exists at all times until the IP address allocated to the UE 211 is released. Bearers other than the default bearer among the EPS bearers 241 to 24n are called dedicated bearers. The dedicated bearers can be suitably generated and released depending on the situation of transmitted user data.

Figure 8:
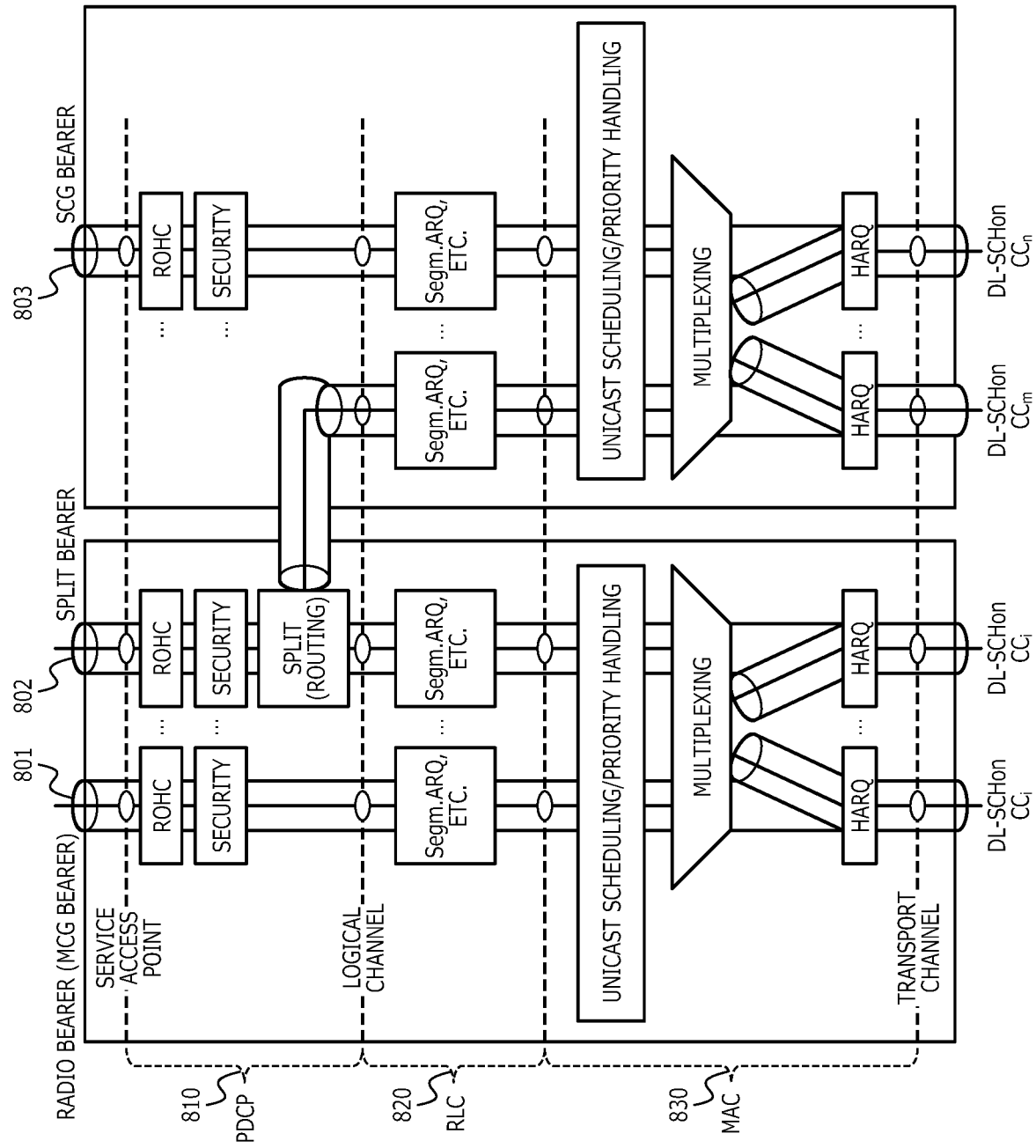
FIG. 8 is a diagram depicting an example of a layer 2 in the wireless communications system according to the second embodiment.

FIG. 8 is a diagram depicting an example of a layer 2 in the wireless communications system according to the second embodiment. In the wireless communications system 200 according to the second embodiment, e.g., processing depicted in FIG. 8 can be applied as the processing of the layer 2. The processing depicted in FIG. 8 is processing of an LTE-A layer 2 defined by 3GPP. As depicted in FIG. 8, the LTE-A layer 2 includes a PDCP 810, an RLC 820, and a MAC 830.

The PDCP 810 includes robust header compression (ROHC) for header compression of inflow IP datagram or processing related to security. The security-related processing includes ciphering and integrity protection, for example. In normal LTE-A communication, these processes of the PDCP 810 are performed on user data and the user data is forwarded to a lower layer (e.g., a layer 1).

In the case of carrying out dual connectivity, for example, the UE 211 is capable of simultaneous communication with at most two base stations (e.g., eNBs 221, 222). A master cell group (MCG) bearer 801 is a radio bearer of a main base station.

The MCG bearer 801 can be accompanied by a split bearer 802 and a secondary cell group (SCG) bearer 803. In the case of using the split bearer 802, when user data is forwarded from the layer 2 to a lower layer (e.g. layer 1), it is possible to select whether the user data is to be forwarded to only one base station or to two base stations.

The RLC 820 includes primary processing prior to wireless transmission of user data. For example, the RLC 820 includes user data segmentation (segm.) for adjusting the user data to a size that depends on radio quality. The RLC 820 may include, e.g., an automatic repeat request (ARQ) for retransmission of user data failing in error correction at a lower layer. When the user data is forwarded to the lower layer, the EPS bearers are mapped to corresponding logical channels and wirelessly transmitted.

The MAC 830 includes wireless transmission control. For example, the MAC 830 includes processing of performing packet scheduling and carrying out a hybrid automatic repeat request (HARQ) of transmitted data. HARQ is carried out for each carrier to be aggregated in carrier aggregation.

In the MAC 830, the sender applies a logical channel identifier (LCID) to a MAC service data unit (SDU) that is user data, for transmission. In the MAC 830, the receiver converts radio bearers into EPS bearers using the LCID applied by the sender.

Figure 9:
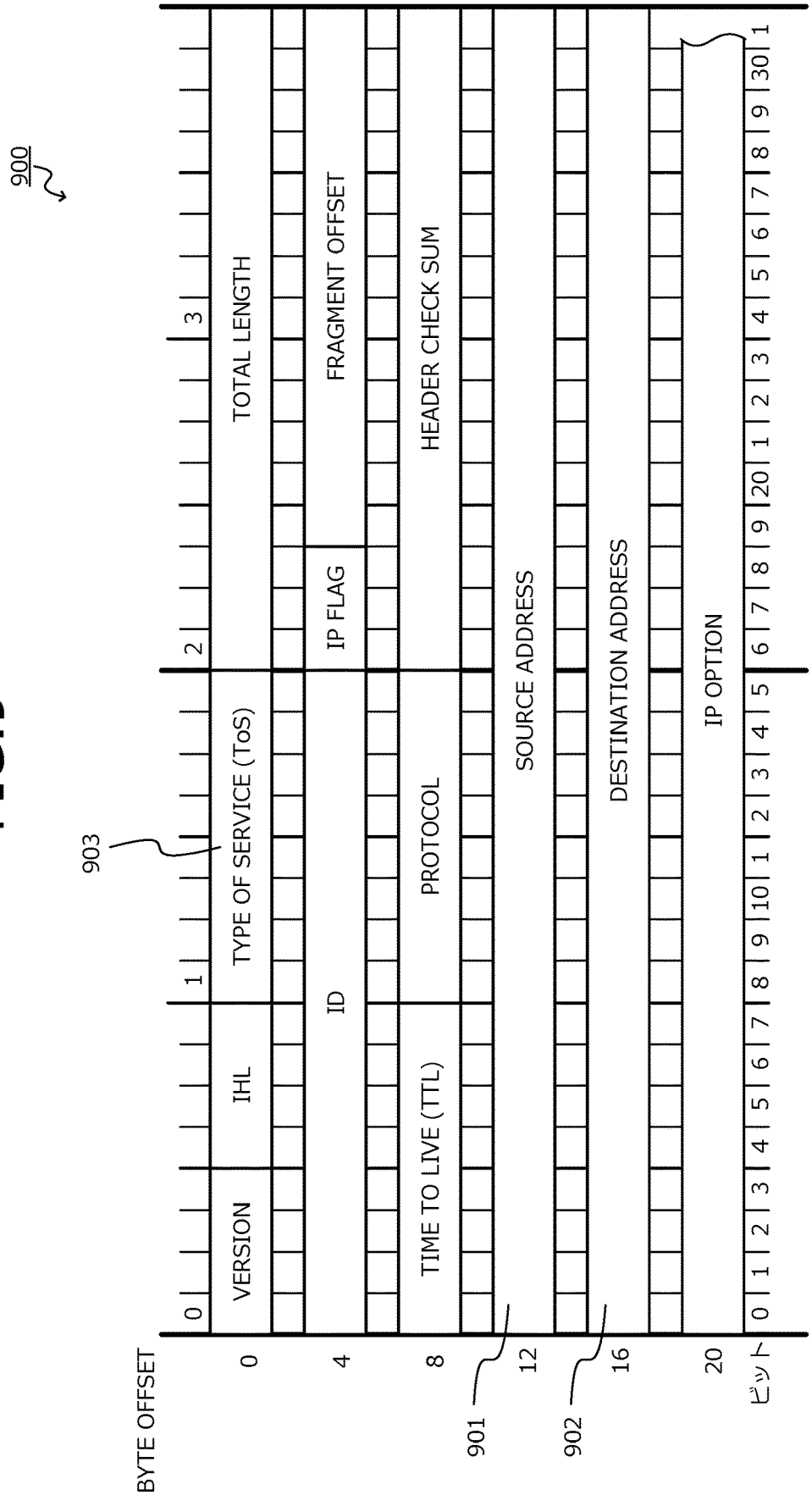
FIG. 9 is a diagram depicting an example of an IP header of an IP packet that is transmitted in the wireless communications system according to the second embodiment.

FIG. 9 is a diagram depicting an example of an IP header of an IP packet that is transmitted in the wireless communications system according to the second embodiment. In the wireless communications system 200 according to the second embodiment, an IP packet having an IP header 900 depicted in FIG. 9, for example, is transmitted. The IP header 900 includes, for example, a source address 901 indicating a source and a destination address 902 indicating a destination. The IP header 900 includes a ToS field 903 for performing QoS. The above-described QoS control is performed on the basis of values of the ToS field 903, for example.

FIG. 10 is a diagram depicting an example of the values of the ToS field included in the IP header of the IP packet that is transmitted in the wireless communications system according to the second embodiment. "First 3 bits" in a table 1000 depicted in FIG. 10 shows an IP precedence corresponding to first 3 bits in the ToS field 903 depicted in FIG. 9, allowing 2^3=8 different patterns. In the table 1000, the 8 different patterns show that upper patterns have higher priorities.

For example, "111" having a highest priority in the IP precedence of the ToS field 903 shows the IP packet corresponds to network control, and is reserved for control such as routing. "110" having a second highest priority in the IP precedence of the ToS field 903 shows that the IP packet corresponds to internet control, and is reserved for control such as routing.

In the example of FIG. 10, although a case has been described where the IP precedence of the ToS field 903 is used as the QoS priority information, the QoS priority information is not limited hereto and a differentiated service code point (DSCP) field, for example, may be used. DSCP is a field corresponding to first 6 bits in the ToS field 903.

Figure 11:
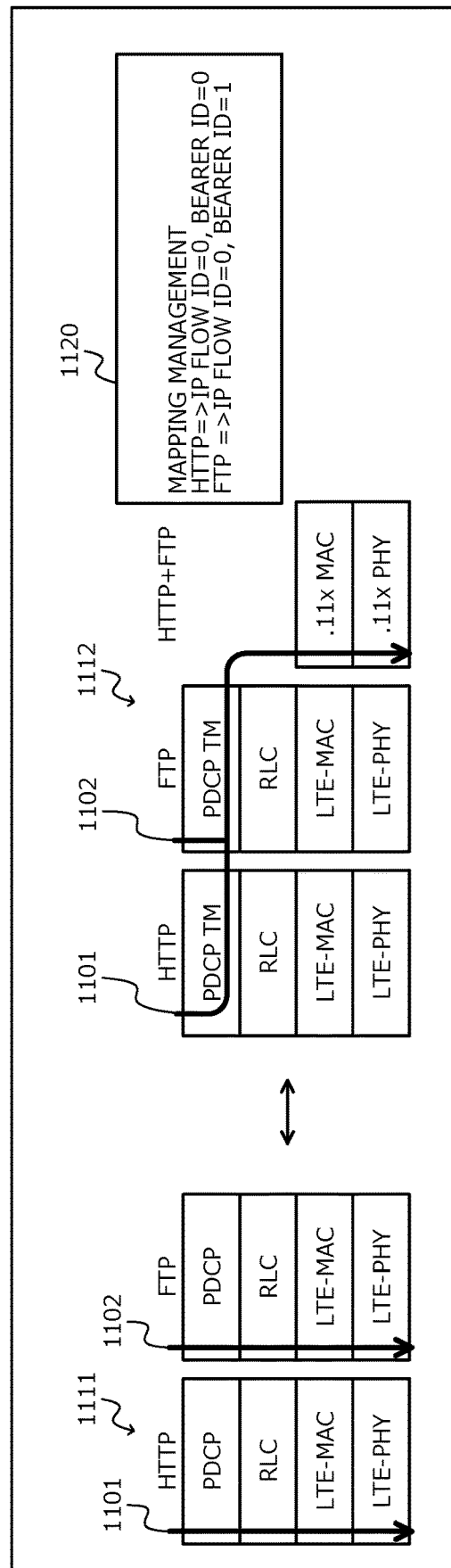
FIG. 11 is a diagram depicting an example of aggregation by LTE-A and WLAN in the wireless communications system according to the second embodiment.

FIG. 11 is a diagram depicting an example of aggregation by LTE-A and WLAN in the wireless communications system according to the second embodiment. Layer 2 processing in the LTE-A and WLAN aggregation is based on, for example, the above-described dual connectivity processing, taking into account LTE-A backward compatibility.

An IP flow 1101 is an IP flow by a hypertext transfer protocol (HTTP) between the UE 211 and the eNB 221. An IP flow 1102 is an IP flow by a file transfer protocol (FTP) between the UE 211 and eNB 221.

Onload processing 1111 shows processing in a case of transmitting the IP flows 1101, 1102 by LTE-A without offloading to a WLAN. This onload processing 1111 corresponds to data transmission that uses wireless communication by the first wireless communication 101 depicted in FIG. 1. In the onload processing 1111, each of the IP flows 1101, 1102 undergoes PDCP, RLC, LTE-MAC, and LTE-PHY processing in the mentioned sequence. These PDCP, RLC, LTE-MAC are, for example, PDCP 810, RLC 820, and MAC 830, respectively, depicted in FIG. 8. The LTE-PHY is a physical layer under LTE-A.

Offload processing 1112 shows processing in the case of offloading and transmitting the IP flows 1101, 1102 to a WLAN. This offload processing 1112 corresponds to data transmission that uses wireless communication by the second wireless communication 102 depicted in FIG. 1. In the offload processing 1112, the IP flows 1101, 1102 undergo PDCP TM, 0.11x MAC, and 0.11x PHY processing in the mentioned sequence. The 0.11x MAC and 0.11x PHY are a MAC layer and a PHY layer, respectively, in WLAN standards (802.11x).

Under LTE-A, the IP flow is classified into bearers and is managed as bearers. On the contrary, in 802.11x of the institute of electrical and electronics engineers (IEEE), in one type of WLAN, for example, the IP flow is managed to be as the IP flow itself, not as bearers. This requires, for example, mapping management 1120 that manages mapping of which bearer belongs to which L2 layer, to thereby perform the onload processing 1111 and the offload processing 1112 at a high speed.

The mapping management 1120 is performed by the RRC that provides wireless control between the UE 211 and the eNB 221, for example. The RRC manages the radio bearers to thereby support, on a radio bearer level, the onload processing 1111 that uses LTE-A wireless communication (first wireless communication 101) and the offload processing 1112 that uses WLAN wireless communication (second wireless communication 102). In the example depicted in FIG. 11, the IP flow 1101 with IP flow ID=0 in HTTP is managed as a bearer with bearer ID=0, whereas the IP flow 1102 with IP flow ID=0 in FTP is managed as a bearer with bearer ID=1.

To enable QoS support in a WLAN in the offload processing 1112, the wireless communications system 200 according to the second embodiment sets PDCP in LTE-A into transparent mode (TM) in the offload processing 1112. This allows the IP flows 1101, 1102 to be offloaded to a WLAN without processes such as ciphering (encryption), header compression, and applying sequence numbers being performed.

This enables the ToS field included in the offloaded IP flows 1101, 1102 to be referred to in WLAN. For example, in QoS in IEEE 802.11e, the IP header ToS field, etc. is referred to whereby the IP flow is aggregated into 4 different access categories (ACs), for QoS management. In the wireless communications system 200, the ToS field included in the offloaded IP flows 1101, 1102 is referred to in a WLAN and ToS field based QoS processing becomes possible.

Note that in the offload processing 1112, for example, ciphering processing in a WLAN is performed on user data transferred to the WLAN. For this reason, even if the user data is transferred to a WLAN without PDCP ciphering processing, the user data can be prevented from being transmitted between the eNB 221 and the UE 211 without being ciphering.

For WLAN ciphering, for example, advanced encryption standard (AES), temporal key integrity protocol (TKIP), wired equivalent privacy (WEP), etc. can be used.

In the example of FIG. 11, although a case has been described where, when performing the offload processing 1112, the IP flows 1101, 1102 do not pass through RLC and LTE-MAC with PDCP as a convergence point (branch point), such processing is not limited hereto. For example, the processing may be such that, when performing the offload processing 1112, the IP flows 1101, 1102 pass through not only PDCP but also through RLC and LTE-MAC, with RLC or LTE-MAC that is a lower layer of PDCP being the convergence point (branch point). In this manner, the processing unit that establishes the convergence point (branch point) when offloading to WLAN may be a processing unit of RLC or LTE-MAC without being limited to the processing of PDCP.

The data link layer (layer 2) of PDCP, RLC, LTE-MAC, etc. can grasp the communication congestion state in a wireless section between the UE 211 and the eNB 221. Thus, by establishing the convergence point in the data link layer for offloading to a WLAN, it can be determined, for example, whether to execute the offload to a WLAN, depending on the communication congestion in the wireless section between the UE 211 and the eNB 221.

Figure 12:
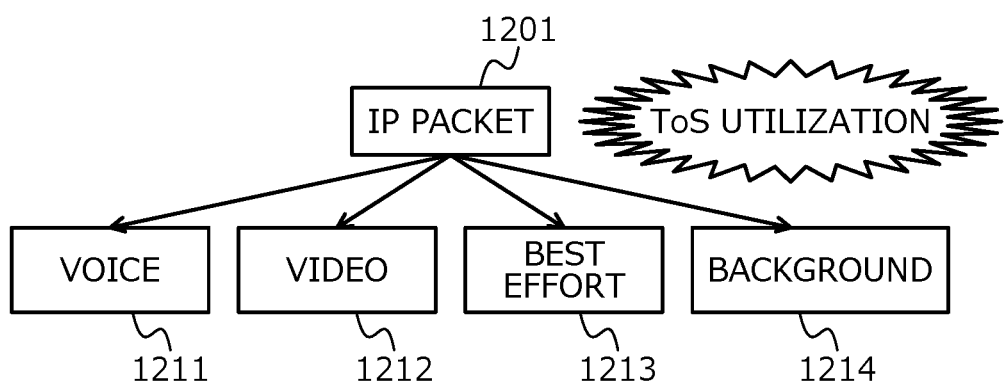
FIG. 12 is a diagram depicting an example of QoS control based on the ToS field in the wireless communications system according to the second embodiment.

FIG. 12 is a diagram depicting an example of QoS control based on the ToS field in the wireless communications system according to the second embodiment. As an example, case will be described where the eNB 221 has a WLAN communication function and an IP packet 1201 is transmitted from the eNB 221 to the UE 211. Based on the ToS field in the IP header of the IP packet 1201, the eNB 221 classifies the IP packet 1201 into ACs 1211 to 1214 of voice, video, best effort, and background, respectively.

In the wireless communications system 200 according to the second embodiment, when offloading to a WLAN, PDCP in LTE-A enters a transparent mode, allowing the IP packet 1201 to be offloaded to a WLAN without ciphering, etc. For this reason, also in the WLAN processing, the eNB 221 refers to the ToS field of the IP packet 1201 so that the AC classification can be performed on the basis of the ToS field.

Although a case has been described where the eNB 221 has the WLAN communication function, the same applies to a case where the eNB 221 transmits an IP flow to a WLAN access point to thereby perform offloading to a WLAN. Although a case (downlink) has also been described where the packet 1201 is transmitted from the eNB 221 to the UE 211, the same applies to a case (uplink) where the IP packet 1201 is transmitted from the UE 211 to the eNB 221.

Figure 13:
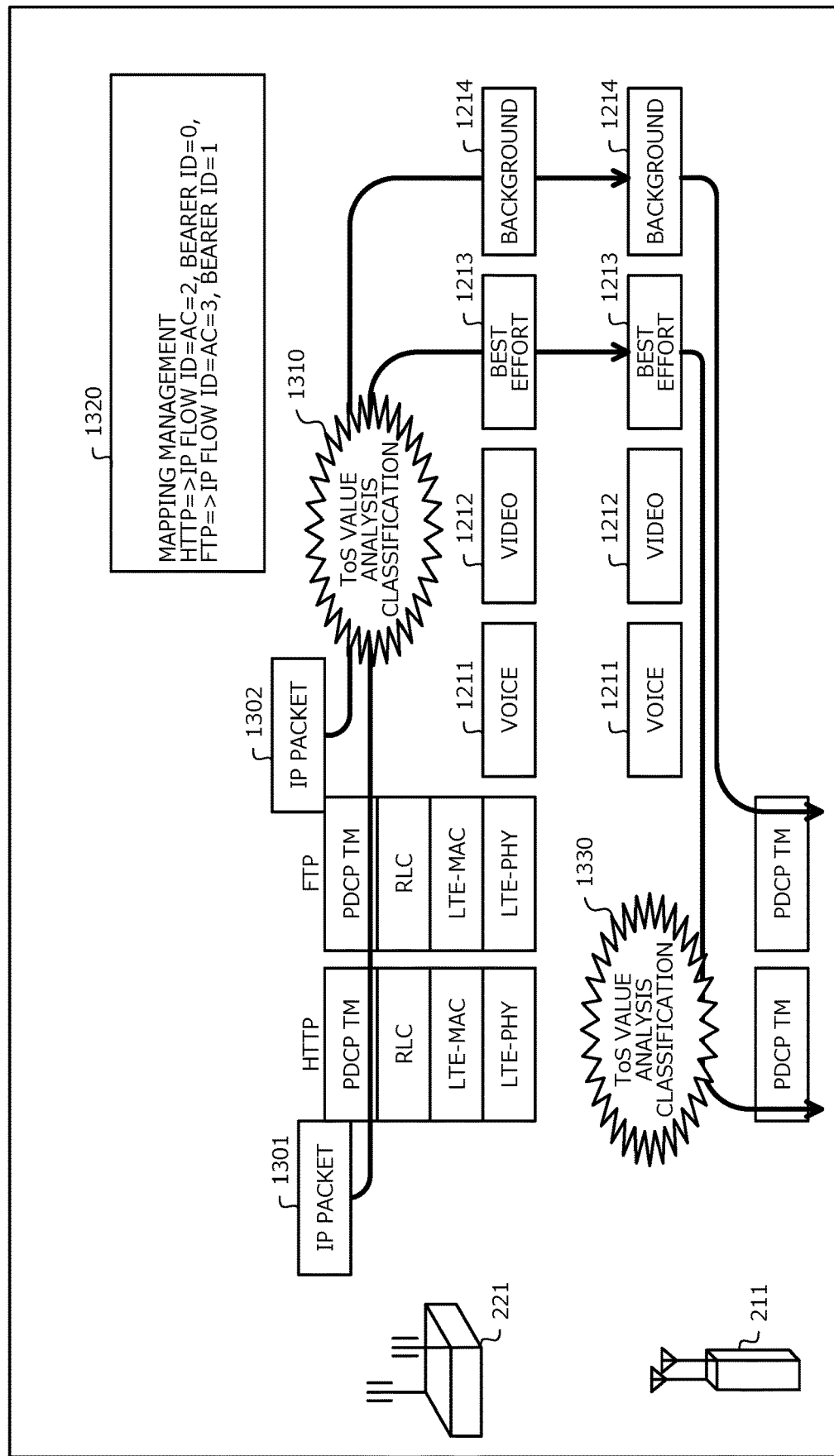
FIG. 13 is a diagram depicting an example of AC classification in the wireless communications system according to the second embodiment.

FIG. 13 is a diagram depicting an example of the AC classification in the wireless communications system according to the second embodiment. In FIG. 13, parts identical to those depicted in FIG. 12 are designated by the same reference numerals used in FIG. 12 and will not again be described.

In FIG. 13, a case will be described where the eNB 221 has the WLAN communication function and the eNB 221 transmits IP packets 1301, 1302 to the UE 211. The IP packets 1301, 1302 are IP packets of HTTP and FTP, respectively.

The eNB 221 performs ToS value analysis classification 1310 by which the IP packets 1301, 1302 are classified into any one of the ACs 1211 to 1214, based on the values of the ToS field included the IP header. In the example of FIG. 13, the eNB 221 classifies the IP packet 1301 into the AC 1213 (best effort) and classifies the IP packet 1302 into the AC 1214 (background). The eNB 221 then transmits to the UE 211 through a WLAN, the IP packets 1301, 1302 for which the ToS value analysis classification 1310 has been performed.

In mapping management 1320 by RRC between the eNB 221 and UE 211, the IP packet 1301 of HTTP is managed as IP flow ID=AC=2, bearer ID=0. AC=2 represents AC1213 (best effort). In the mapping management 1320, the IP packet 1302 of FTP is managed as IP flow ID=AC=3, bearer ID=1. AC=3 represents AC1214 (background).

The UE 211 performs ToS value analysis classification 1330 (declassification) corresponding to the ToS value analysis classification 1310 (classification) on the eNB 221 side, to thereby terminate the IP packets 1301, 1302 by PDCP (transparent mode).

Although the case (downlink) has been described where the packets 1301, 1302 are sent from the eNB 221 to the UE 211, the same applies to a case (uplink) where the IP packets 1301, 1302 are sent from the UE 211 to the eNB 221.

Figure 14:
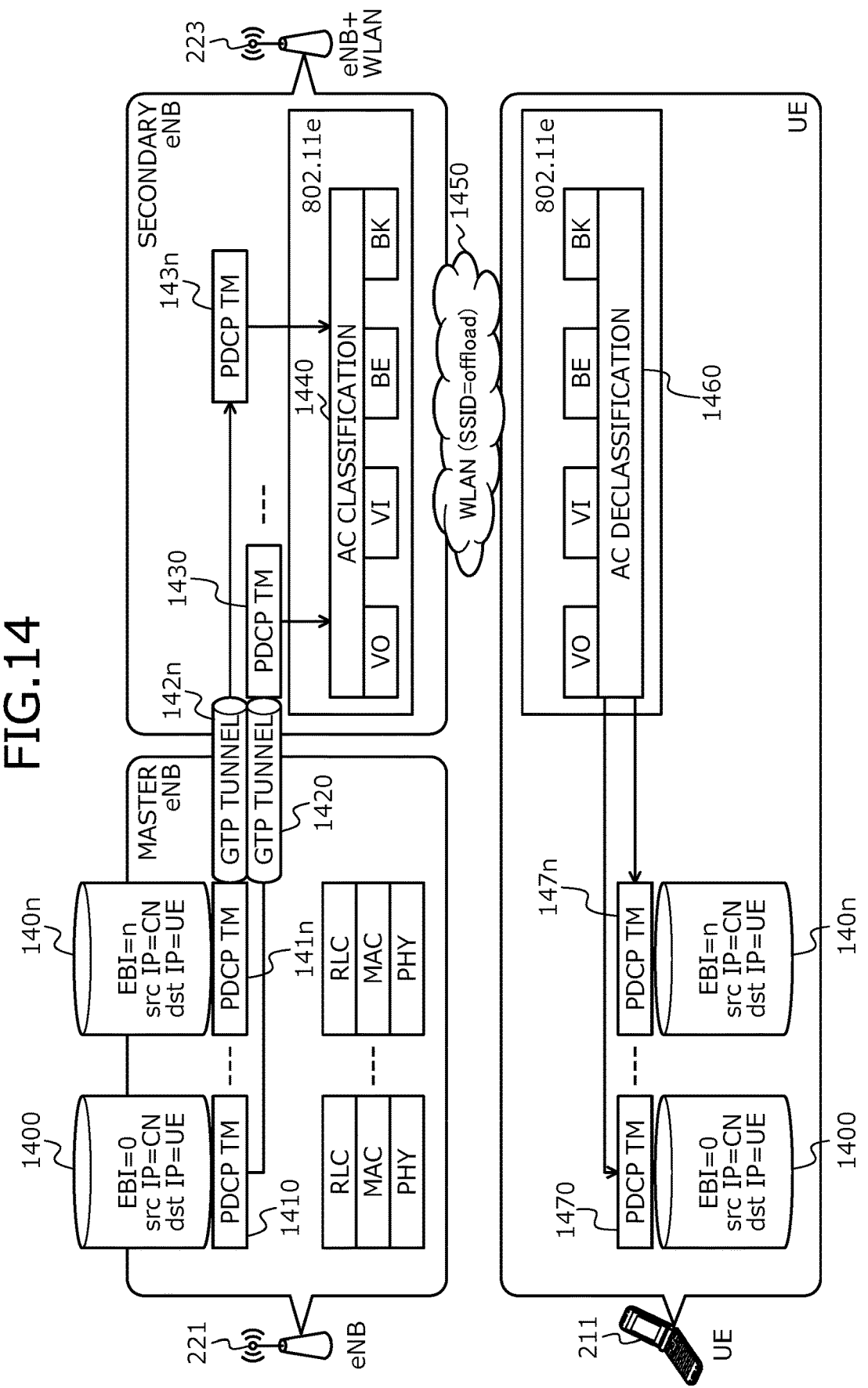
FIG. 14 is a diagram depicting an example of offload in the wireless communications system according to the second embodiment.

FIG. 14 is a diagram depicting an example of the offload in the wireless communications system according to the second embodiment. In FIG. 14, a case of the downlink will be described where offloading to a WLAN is performed in a WLAN standalone configuration using a secondary eNB 223 having eNB and WLAN communication functions (eNB+WLAN), and the eNB 221 acts as a master eNB. Offloading to a WLAN is data transmission using the second wireless communication 102 depicted in FIG. 1. The secondary eNB 223 is a base station capable of communication with the eNB 221 via the interface between base stations such as an X2 interface for example and capable of WLAN communication with the UE 211.

In the example depicted in FIG. 14, a case will be described where 10 EPS bearers 1400 to 140n are configured for communication between the eNB 221 and the UE 211, the EPS bearers 1400 to 140n being offloaded to a WLAN. In the example depicted in FIG. 14, the EPS bearers 1400 to 140n are downlink direction bearers from the eNB 221 toward the UE 211. Although in FIG. 14, a case will be described where 10 EPS bearers 1400 to 140n are configured, the number of the EPS bearers to be configured is optional.

The EPS bearers 1400 to 140n are n+1 EPS bearers having EPS bearer IDs (EBIs) of 0 to n (n is 10, for example), respectively. A source (src IP) of all the EPS bearers 1400 to 140n is a core network (CN). A destination (dst IP) of all the EPS bearers 1400 to 140n is the UE 211 (UE).

In the case of offloading the EPS bearers 1400 to 140n to a WLAN, the eNB 221 transfers the EPS bearers 1400 to 140n via PDCP layers 1410 to 141n, respectively, to the secondary eNB 223. That is, the eNB 221 controls the offload to a WLAN of the EPS bearers 1400 to 140n by the layer 2 (PDCP in the example depicted in FIG. 14) of LTE-A.

At this time, the eNB 221 sets the PDCP layers 1410 to 141n into the transparent mode (PDCP TM) so that processes such as ciphering of PDCP and header compression are not performed for the EPS bearers 1400 to 140n. This allows the EPS bearers 1400 to 140n to be offloaded intact as PDCP service data unit (SDU) to the secondary eNB 223. In other words, the EPS bearers 1400 to 140n are offloaded to a WLAN, with the above-described ToS field (QoS information) being transparent, i.e., with the IP header including the ToS field for which processes such as ciphering and header compression are not performed. The PDCP SDU is data equivalent to an IP datagram.

Transfer of the EPS bearers 1400 to 140n from the eNB 221 to the secondary eNB 223 can be performed in the same manner as, for example, LTE-A handover. For example, transfer of the EPS bearers 1400 to 140n from the eNB 221 to the secondary eNB 223 can be performed using GTP tunnels 1420 to 142n between the eNB 221 and the secondary eNB 223. The GTP tunnels 1420 to 142n are GTP tunnels respectively configured for each of the EPS bearers between the eNB 221 and the secondary eNB 223.

The secondary eNB 223 receives the EPS bearers 1400 to 140n transferred from the eNB 221 via the GTP tunnels 1420 to 142n, respectively, through PDCP layers 1430 to 143n, respectively. The secondary eNB 223 performs AC classification 1440 for PDCP SDUs corresponding to the received EPS bearers 1400 to 140n, based on the ToS field included in the IP header of each of PDCP SDUs.

The AC classification 1440 is processing by a WLAN function (802.11e) at the secondary eNB 223. The PDCP SDUs are classified by the AC classification 1440 into any AC among voice (VO), video (VI), best effort (BE), and background (GK), as depicted in FIG. 12 for example.

The secondary eNB 223 transmits the PDCP SDUs classified by the AC classification 1440, through a WLAN 1450 to the UE 211. In this case, a service set identifier (SSID) in the WLAN 1450 can be "offload" for example.

For each PDCP SDUs received via the WLAN 1450, the UE 211 performs AC declassification 1460 based on ToS field included in IP header of PDCP SDUs.

The UE 211 reclassifies the PDCP SDUs received by the AC declassification 1460, into EPS bearers 1400 to 140n on the basis of respective classified ACs. The UE 211 then processes the reclassified EPS bearers 1400 to 140n by PDCP layers 1470 to 147n, respectively, for reception.

At this time, the PDCP layers 1410 to 141n in the eNB 221 are in the transparent mode so that the EPS bearers 1400 to 140n do not perform processing such as ciphering of the PDCP and header compression. For this reason, the UE 211 sets the PDCP layers 1470 to 147n at the UE 211 into the transparent mode (PDCP TM) so as not to perform processes such as decoding for ciphering and header decompression for the header compression.

In this manner, the wireless communications system 200 enables the PDCP layers 1410 to 141n of the eNB 221 to be in the transparent mode when offloading the EPS bearers 1400 to 140n to the WLAN 1450. Thus, at the secondary eNB 223 as the offloading destination, the ToS field included in the IP header of each of PDCP SDUs can be referred to. For this reason, when offloading the EPS bearers 1400 to 140n to the WLAN 1450, the AC classification 1440 based on the ToS field is performed so that QoS control can be provided in accordance with the traffic property.

For example, when offloading an EPS bearer of VoLTE to the WLAN 1450, this EPS bearer is classified as the voice (VO) for preferential transmission to the WLAN 1450 whereby the communication quality of VoLTE can be improved.

It is to be understood that in the WLAN 1450, the AC classification can be performed by referring to a priority value within the VLAN tag defined under IEEE802.1q. The VLAN tag is a VLAN identifier.

By configuring the PDCP on the LTE-A side to the transparent mode to avoid the ciphering, etc., the QoS control in offloading to a WLAN becomes possible without altering existing chipsets related to the PHY layer or the MAC layer in the WLAN.

In FIG. 14, a case has been described where offloading to a WLAN is performed in the WLAN standalone configuration that uses the secondary eNB 223 having eNB and WLAN communication functions (eNB+WLAN), with the eNB 221 serving as the master eNB. It is to be appreciated that offloading to a WLAN is not limited hereto and the offload to a WLAN may be performed in, for example, a configuration where the eNB 221 has the WLAN communication function (eNB+WLAN) as well. In this case, the eNB 221 also performs communication via a WLAN with the UE 211 without using the secondary eNB 223.

Use of the secondary eNB 223 may be omitted when transmitting user data by onload using LTE-A without offloading to a WLAN, i.e., when transmitting user data using the first wireless communication 101 depicted in FIG. 1. In this case, for example, the eNB 221 configures the PDCP layers 1410 to 141n to a non-transparent mode allowing PDCP processing such asciphering. The eNB 221 then processes the EPS bearers 1400 to 140n processed by the non-transparent mode PDCP layers 1410 to 141n, in the order of RLC, MAC, and PHY, for wireless transmission via LTE-A to the UE 211. The UE 211 receives the EPS bearers 1400 to 140n transmitted via LTE-A from the eNB 221, through processing by PHY, MAC, RLC, and PDCP (PDCP layers 1470 to 147n). In this case, the UE 211 configures the PDCP layers 1470 to 147n to the non-transparent mode allowing the PDCP processing such as decoding corresponding to the ciphering.

FIG. 15 is a diagram depicting an example of mapping to QoS class ACs applicable to the wireless communications system according to the second embodiment. The WLAN sender (e.g. the secondary eNB 223) classifies into ACs, EPS bearers that are to be transmitted, as in a table 1500 of FIG. 15, for example. The QoS classes of the EPS bearers are identified by QoS class identifiers (QCIs).

The QCIs are classified into four ACs, i.e. voice (VO), video (VI), best effort (BE), and background (BK). The WLAN receiver (e.g., the UE 211) performs conversion from ACs to the QoS classes. To that end, the eNB 221 configures, in advance, EPS bearers to be offloaded to the UE 211. On the contrary, in the downlink, for example, the UE 211 can specify an EPS bearer on the basis of the EPS bearer configured by the eNB 221. In the uplink, the UE 211 may perform the AC classification on the basis of the EPS bearer configured by the eNB 221.

FIG. 16 is a flowchart depicting an example of processing by a sender apparatus in the wireless communications system according to the second embodiment. In FIG. 16, a downlink case will be described where user data is transmitted from the eNB 221 to the UE 211.

First, the eNB 221 determines whether to execute offload to a WLAN with respect to user data to the UE 211 (step S1601). A method of determination at step S1601 will be described later.

At step S1601, when determining that offload is not to be executed (step S1601: NO), the eNB 221 configures PDCP layers thereof to a non-transparent mode (step S1602). The non-transparent mode is a normal mode of the PDCP layers that performs processes such as ciphering of PDCP and header compression for user data. At step S1602, the eNB 221 may control the UE 211 such that the PDCP layers of the UE 211 are also configured to the non-transparent mode in aligning with the PDCP layers of the eNB 221.

The eNB 221 then transmits user data to the UE 211 by LTE-A (step S1603), to end a series of processes. Since the PDCP layers of the eNB 221 are configured to the non-transparent mode at step S1602, user data on which is performed ciphering of the PDCP and header compression etc is transmitted at step S1603. On the contrary, the UE 211 performs processes such as decoding for ciphering and header decompression for the header compression in the PDCP layers so that the UE 211 can receive user data transmitted from the eNB 221.

At step S1601, when determining that offload is to be executed (step S1601: YES), the eNB 221 configures the PDCP layers thereof to a transparent mode (step S1604). At step S1604, the eNB 221 may control the UE 211 such that the PDCP layers of the UE 211 are also allowed to be configured to the transparent mode aligning with the PDCP layers of the eNB 221.

The eNB 221 then transmits user data destined for the UE 211 through WLAN (step S1605), to end a series of processes. For example, in a case where the eNB 221 has a WLAN communication function, the eNB 221 uses the WLAN communication function thereof to transmit the user data destined for the UE 211. On the other hand, in a case where the eNB 221 does not have a WLAN communication function, the eNB 221 transfers the user data destined for the UE 211 to the secondary eNB 223 with the WLAN communication function connected to the eNB 221, to thereby transmit the user data destined for the UE 211.

Since the PDCP layers of the eNB 221 are set to the transparent mode at step S1604, the user data is transmitted at step S1605 without ciphering of the PDCP, header compression, etc. being performed. Thus, the QoS control based on the ToS field in the WLAN becomes possible.

The determination at step S1601 can be made based, for example, on whether the UE 211 or the network side (e.g., the PGW 232) issues an instruction to offload the user data of the UE 211 to a WLAN. The determination at step S1601 can be made based, for example, on whether the amount of user data to the UE 211 exceeds a threshold value. The amount of the user data may be an amount per hour or a total amount of a series of user data of the UE 211. Alternatively, the determination at step S1601 can be made based, for example, on a delay time in LTE-A communication between the eNB 221 and the UE 211 or on a delay time in WLAN communication between the eNB 221 and the UE 211.

Although in FIG. 16, the processing by the eNB 221 has been described for a case of downlink where the user data is transmitted from the eNB 221 to the UE 211, the same applies to processing by the UE 211 in an uplink case where the user data is transmitted from the UE 211 to the eNB 221. Note that the processing at step 1605 differs depending on whether the eNB 221 has a WLAN communication function. When the eNB 221 has the WLAN communication function, the UE 211 transmits user data destined for the eNB 221 directly to the eNB 221. On the other hand, when the eNB 221 does not have the WLAN communication function, the UE 211 transfers the user data destined for the eNB 221 to the secondary eNB 223 with the WLAN communication function connected to the eNB 221, to thereby transmit the user data destined for the eNB 221.

Figure 17:
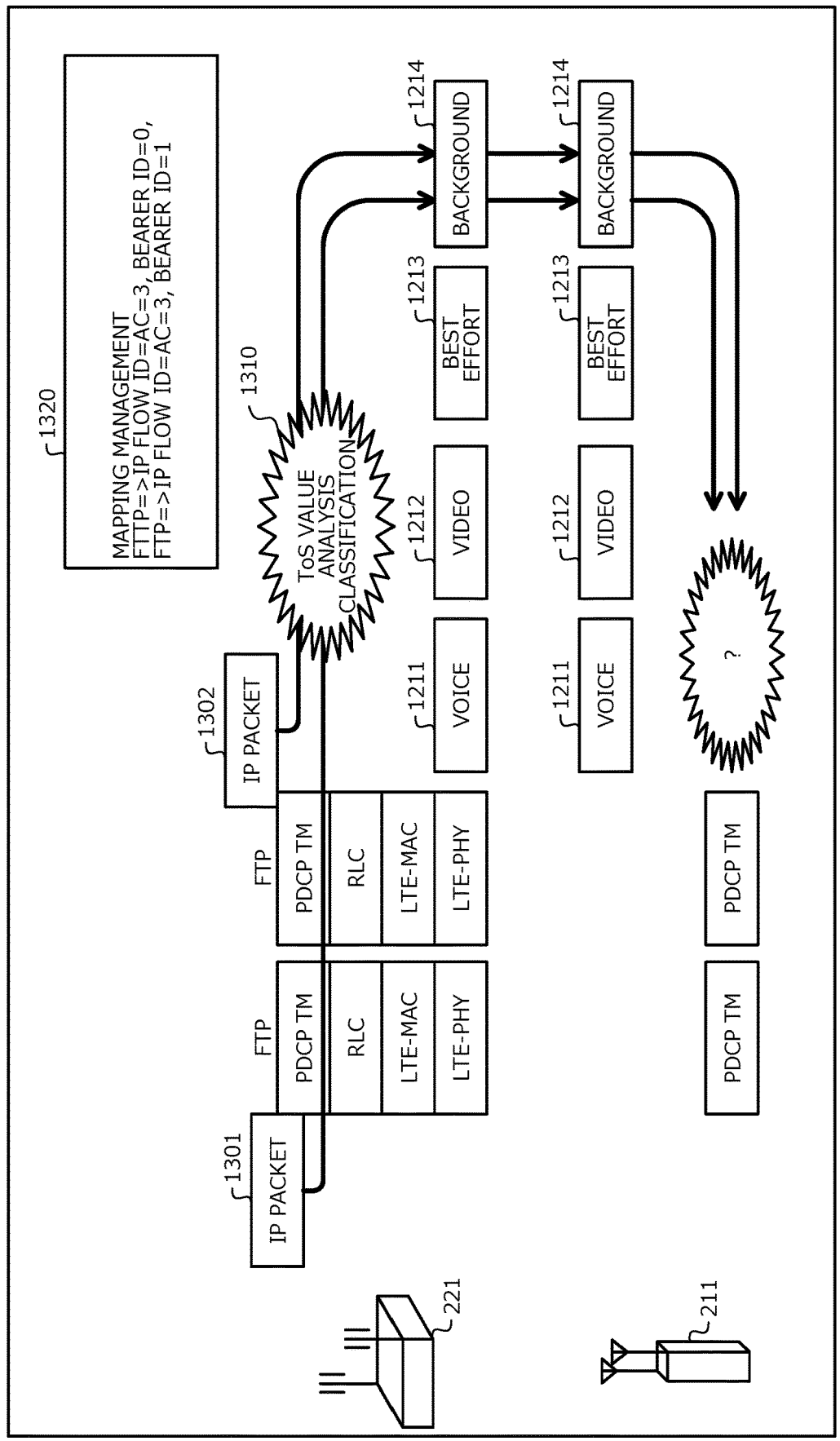
FIG. 17 is a diagram depicting an example of a case where plural EPS bearers have a same QoS class in the wireless communications system according to the second embodiment.

FIG. 17 is a diagram depicting an example of a case where plural EPS bearers have the same QoS class in the wireless communications system according to the second embodiment. In FIG. 17, parts similar to those depicted in FIG. 13 are given the same reference numerals used in FIG. 13 and explanations of similar parts will be omitted. For example, when both the IP packets 1301, 1302 are background IP packets, the IP packets 1301, 1302 are both classified into the AC 1214 (background) in the ToS value analysis classification 1310.

In this case, the IP packet 1301 of HTTP is managed as IP flow ID=AC=3, bearer ID=0 in the mapping management 1320 in RRC between the UE 211 and the eNB 221. In the mapping management 1320, the IP packet 1302 of FTP is managed as IP flow ID=AC=3, bearer ID=1.

In this case, even though the UE 211 performs the ToS value analysis classification 1330 corresponding to the ToS value analysis classification 1310, the UE 211 cannot determine based on AC which IP packet 1301, 1302 received is which EPS bear with bearer ID=0, 1.

In the case of transmitting user data through a WLAN, the LCID cannot be applied to the IP datagram (PDCP SDU). For this reason, the eNB 221 cannot determine based on LCID which IP packet 1301, 1302 received is which EPS bearer with bearer ID=0, 1.

In this manner, in the case that plural EPS bearers have the same QoS class, the receiver (the UE 211 in the example depicted in FIG. 17) may not be able to uniquely identify the EPS bearers. This means that the receiver may not be able to convert the received radio bearers to EPS bearers. In the uplink in particular, IP flows between the eNB 221 and the PGW 232 are managed as EPS bearers and hence, IP flow transmission from the eNB 221 to the PGW 232 becomes difficult if the eNB 221 cannot convert the radio bearers to EPS bearers.

On the contrary, in the wireless communications system 200 according to the second embodiment, for example, the sender among the UE 211 and the eNB 221 is prevented from simultaneously offloading EPS bearers having the same QoS class.

For example, in a case of transmitting plural EPS bearers having the same QoS class to the UE 211, the sender offloads only one of the plural EPS bearers to a WLAN and sends the remaining EPS bearers to the UE 211 without offload to a WLAN. Alternatively, in a case of transmitting plural EPS bearers having the same QoS class to the UE 211, the sender performs transmission through LTE-A without offload to a WLAN. This prevents plural EPS bearers having the same QoS class from being simultaneously offloaded to a WLAN, resulting in that the UE 211 can uniquely specify an EPS bearer on the basis of the AC, for each user data offloaded to a WLAN.

Alternatively, in a case of sending plural bearers having the same QoS class to the UE 211, the sender among the UE 211 and the eNB 221 may perform a process of aggregating the plural EPS bearers into one bearer. The process of aggregating plural EPS bearers into one bearer can use "UE requested bearer resource modification procedure" defined in TS23.401 of 3GPP, for example. This prevents plural EPS bearers having the same QoS class from being simultaneously offloaded to a WLAN, resulting in that the UE 211 can uniquely specify an EPS bearer on the basis of the AC, for each user data offloaded to a WLAN.

In this manner, according to the second embodiment, the sender station among the eNB 221 and the UE 211 renders QoS information transparent in the PDCP that is an LTE-A processing unit when transmitting user data using a WLAN under control from RRC that controls LTE-A.

This makes it possible for the sender station among the eNB 221 and the UE 211 to provide QoS control in accordance with QoS information in the user data transmission processing in a WLAN. It is therefore possible to suppress decreases in communication quality attributable to user data transmission using offload to a WLAN or to maintain the communication quality.

In a third embodiment, a method will be described that is capable of increasing the amount of offloadable user data by eliminating the restriction that EPS bearers having the same QoS class are not offloaded at the same time. The third embodiment can be regarded as an example obtained by embodying the above first embodiment and hence, can naturally be carried out in combination with the first embodiment. The third embodiment can naturally be carried out in combination with parts common to the second embodiment.

Figure 18:
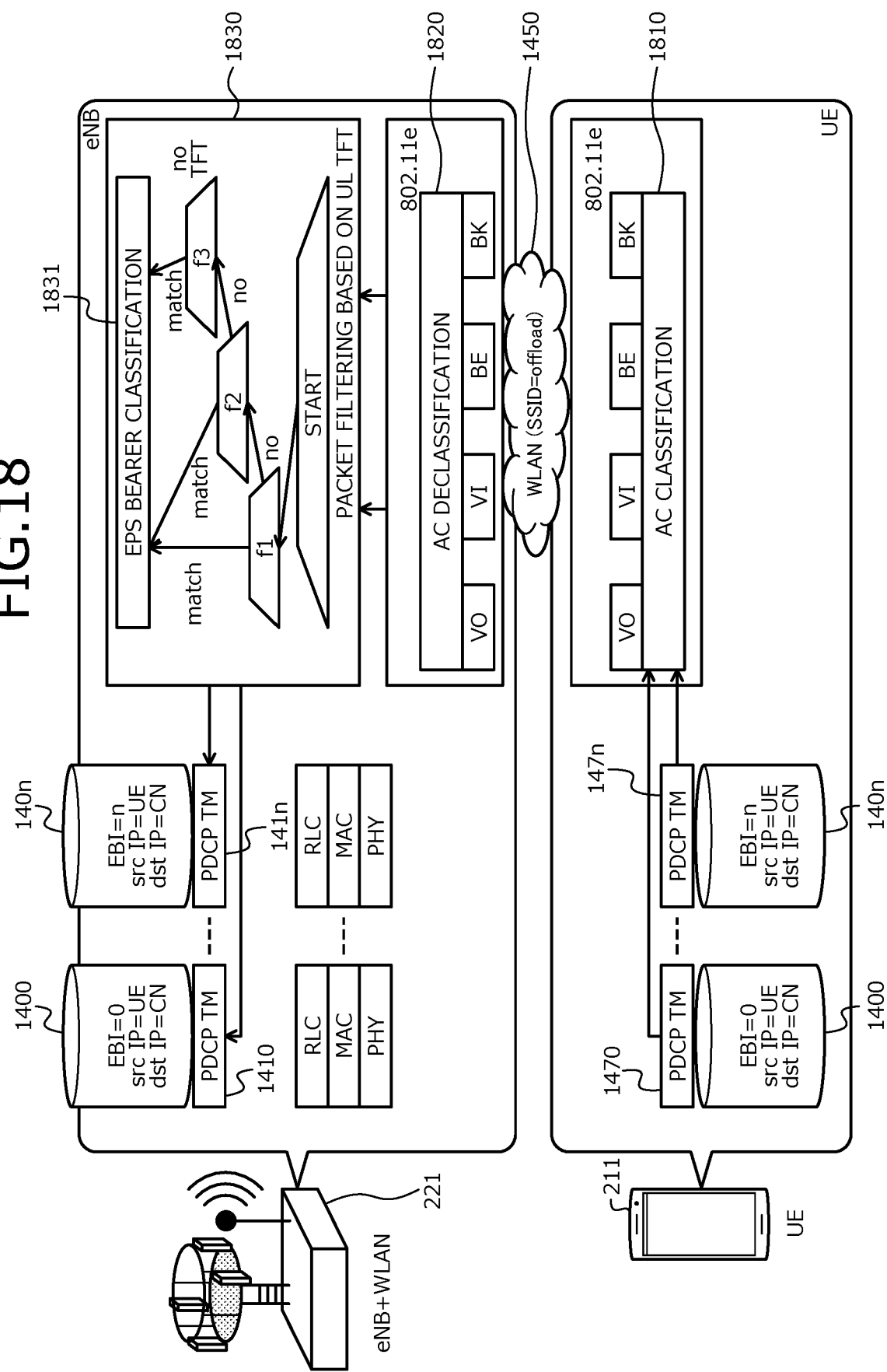
FIG. 18 is a diagram depicting an example of a method of identifying EPS bearers using a UL TFT in the wireless communications system according to a third embodiment.

FIG. 18 is a diagram depicting an example of a method of identifying EPS bearers using UL TFT in a wireless communications system according to the third embodiment. In FIG. 18, parts similar to those depicted in FIG. 14 are designated by the same reference numerals used in FIG. 14 and will not again be described.

In FIG. 18, the uplink will be described for a case of offloading to a WLAN in a configuration where the eNB 221 has a WLAN communication function (eNB+WLAN). In the example depicted in FIG. 18, EPS bearers 1400 to 140$n$ are uplink direction bearers from the UE 211 to the eNB 221. That is, the source (src IP) of all the EPS bearers 1400 to 140$n$ is the UE 211 (UE). The destination (dst IP) of all the EPS bearers 1400 to 140$n$ is the core network (CN).

In the case of offloading the EPS bearers 1400 to 140$n$ to a WLAN, the UE 211 causes the EPS bearers 1400 to 140$n$ to go through the PDCP layers 1470 to 147$n$. At this time, the UE 211 sets the PDCP layers 1470 to 147$n$ into the transparent mode (PDCP TM) so that the PDCP layers 1470 to 147$n$ cannot perform processes such as ciphering and header compression for the EPS bearers 1400 to 140$n$. This allows the EPS bearers 1400 to 140$n$ going through the PDCP layers 1470 to 147$n$ to remain as PDCP SDU.

The UE 211 performs for the PDCP SDUs corresponding to EPS bearers 1400 to 140$n$ going through the PDCP layers 1470 to 147$n$, AC classification 1810 based on the ToS field included the IP head of each PDCP SDU. The AC classification 1810 is processing by a WLAN function (802.11e) at the UE 211.

The PDCP SDUs classified by the AC classification 1810 are transmitted via the WLAN 1450 to the eNB 221. The eNB 221 performs for the PDCP SDUs received via the WLAN 1450, AC declassification 1820 based on the ToS field included in the IP header of each PDCP SDU. The AC declassification 1820 is processing by a WLAN function (802.11e) at the eNB 221.

The eNB 221 applies packet filtering 1830 based on uplink (UL) TFT, to each of the PDCP SDUs received through the AC declassification 1820. In the packet filtering 1830, the PDCP SDUs are filtered depending on whether conditions (f1 to f3) corresponding to TFT are fulfilled (match/no). Then, in accordance with the results of this filtering, EPS bearer classification 1831 identifying the EPS bearers is carried out. As a result, EPS bearers corresponding to the offloaded PDCP SDUs are identified. A method of acquiring the UL TFT at the eNB 221 will be described later (for example, refer to FIG. 20).

On the basis of the results of identification by the EPS bearer classification 1831, the eNB 221 transfers the PDCP SDUs to PDCP layers corresponding to EPS bearers of the PDCP SDUs among the PDCP layers 1410 to 141$n$. Thus, the PDCP SDUs (IP flow) offloaded by the WLAN are converted into corresponding EPS bearers, for transfer to the PDCP layers 1410 to 141$n$.

The PDCP layers 1410 to 141$n$ terminate the EPS bearers offloaded by WLAN. At this time, the PDCP layers 1470 to 147$n$ in the UE 211 are in the transparent mode so that processes such as ciphering of PDCP and header compression are not performed for the EPS bearers 1400 to 140$n$. For this reason, the eNB 221 sets the PDCP layers 1410 to 141$n$ in the eNB 221 into the transparent mode (PDCP TM) so that processes such as decoding for ciphering and header decompression for the header compression are not performed. The EPS bearers terminated by the PDCP layers 1410 to 141$n$ are transmitted via the SGW 231 to the PGW 232.

In this manner, by performing the packet filtering 1830 based on UL TFT for offloaded PDCP SDUs, the eNB 221 can identify EPS bearers of the offloaded PDCP SDUs. For this reason, without setting the restriction that EPS bearers having the same QoS class cannot be offloaded to a WLAN at the same time, the wireless communications system 200 enables the offload to a WLAN and can achieve an increase in the amount of offloadable user data.

Next, a case will be described where user data is transmitted by onload using LTE-A without offload to a WLAN, i.e., a case will be described where the user data is transmitted using the first wireless communication 101 depicted in FIG. 1. In this case, for example, the UE 211 configures the PDCP layers 1470 to 147$n$ to the non-transparent mode allowing PDCP processing such as ciphering. The UE 211 then processes the EPS bearers 1400 to 140$n$ processed by the non-transparent mode PDCP layers 1470 to 147$n$, in the order of RLC, MAC, and PHY, for wireless transmission by LTE-A to the eNB 221. The eNB 221 processes the EPS bearers 1400 to 140$n$ transmitted by the LTE-A from the UE 211, by PHY, MAC, RLC, and PDCP (PDCP layers 1410 to 141$n$), for reception. In this case, the eNB 221 sets the PDCP layers 1410 to 141$n$ to the non-transparent mode allowing the PDCP processing such as decoding corresponding to ciphering.

Figure 19:
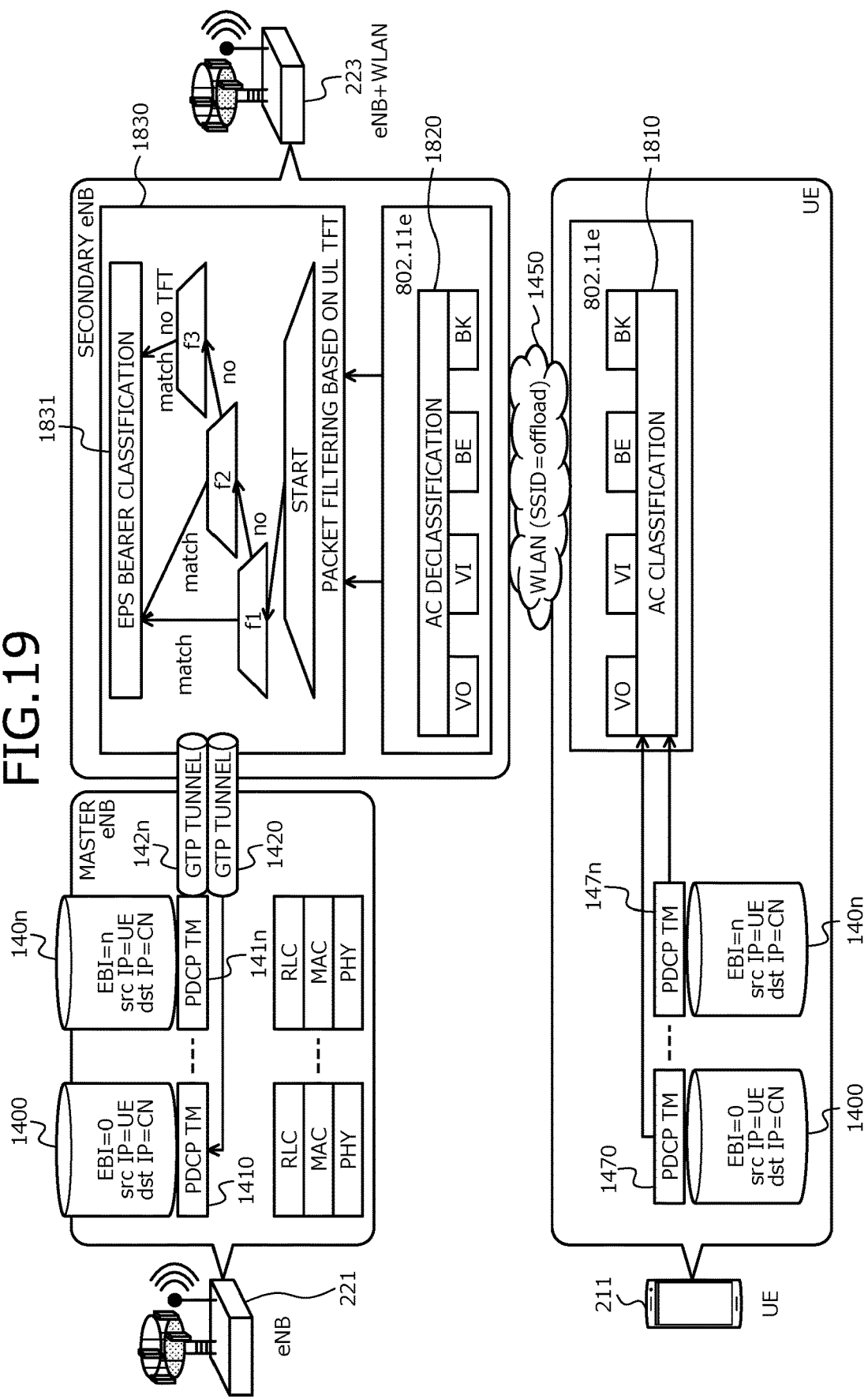
FIG. 19 is a diagram depicting another example of a method of identifying EPS bearers using a UL TFT in the wireless communications system according to the third embodiment.

FIG. 19 is a diagram depicting another example of a method of identifying EPS bearers using UL TFT in the wireless communications system according to the third embodiment. In FIG. 19, parts similar to those depicted in FIG. 14 or 18 are designated by the same reference numerals and explanations thereof will be omitted.

In FIG. 19, a case of the uplink will be described where the offload to a WLAN is performed in the WLAN standalone configuration using the secondary eNB 223 having the eNB and WLAN communication functions, with the eNB 221 acting as the master eNB. In this case, the GTP tunnels 1420 to 142$n$ are provided for each of EPS bearers between the eNB 221 and the secondary eNB 223.

The secondary eNB 223 receives the PDCP SDUs transmitted via the WLAN 1450 from the UE 211. The secondary eNB 223 performs the AC declassification 1820 and the packet filtering 1830 similar to those in the example depicted in FIG. 18, for each of the received PDCP SDUs. This allows the EPS bearer classification 1831 in the packet filtering 1830 to be performed for each PDCP SDU so that an EPS bearer corresponding to each PDCP SDU is identified.

Based on the result of identification by the EPS bearer classification 1831, the secondary eNB 223 transfers each PDCP SDU to a GTP tunnel corresponding to the EPS bearer of the each PDCP SDU, among the GTP tunnels 1420 to 142n. As a result, the PDCP SDUs are transferred to corresponding PDCP layers among the PDCP layers 1410 to 141n of the eNB 221.

In this manner, the secondary eNB 223 performs the packet filtering 1830 based on UL TFT for the offloaded PDCP SDUs, so as to be able to identify the EPS bearers of the offloaded PDCP SDUs. Depending on the results of identification of the EPS bearers, the secondary eNB 223 then transfers the PDCP SDUs through the GTP tunnels 1420 to 142n, whereby the eNB 221 can receive the offloaded PDCP SDUs as EPS bearers.

For this reason, without setting the restriction that EPS bearers having the same QoS class cannot be offloaded to a WLAN at the same time, the wireless communications system 200 enables the offload to a WLAN and can achieve an increase in the amount of offloadable user data.

Figure 20:
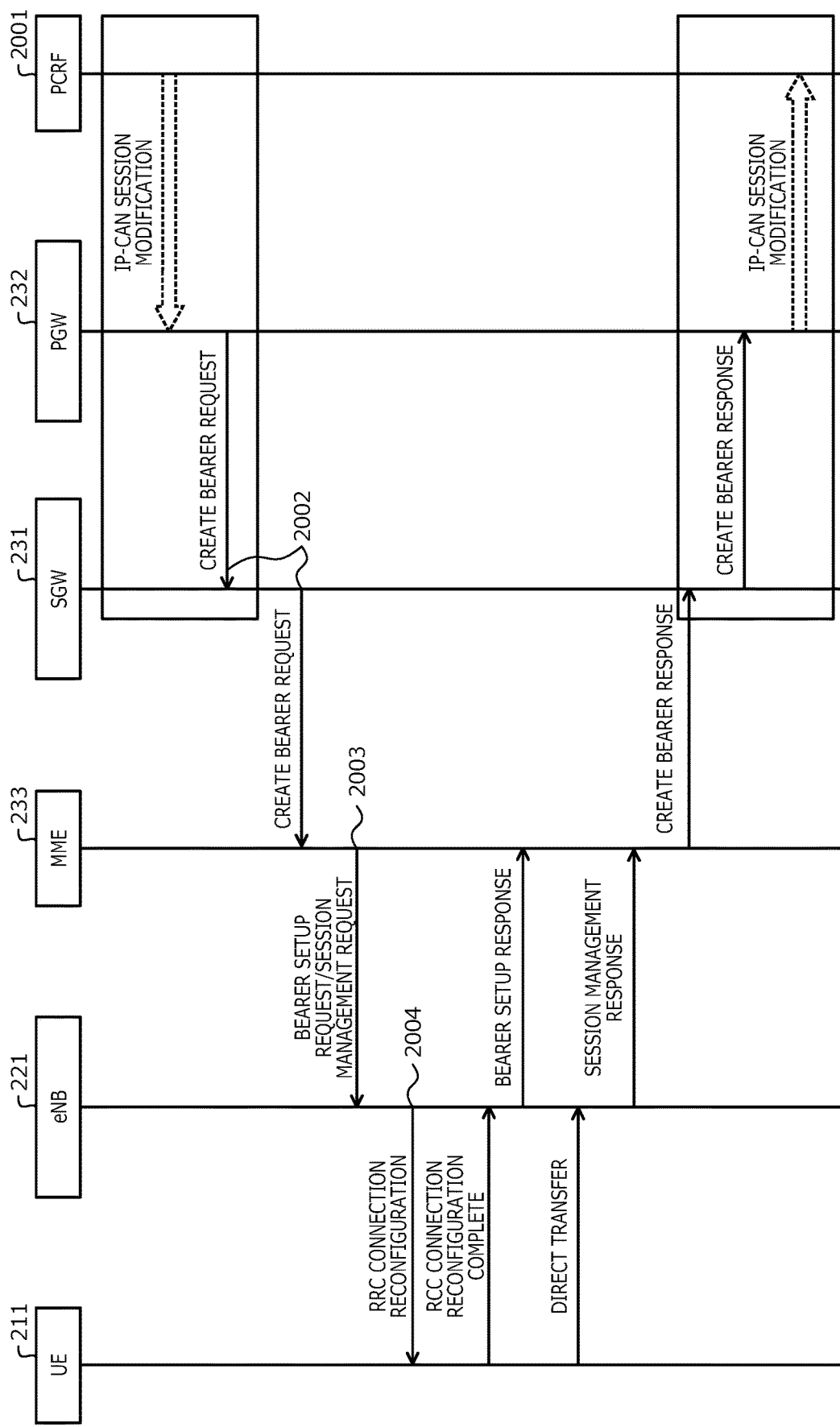
FIG. 20 is a diagram depicting an example of a TFT acquisition method in the wireless communications system according to the third embodiment.

FIG. 20 is a diagram depicting an example of a TFT acquisition method in the wireless communications system according to the third embodiment. Steps depicted in FIG. 20 are processes of a "Dedicated bearer activation procedure" defined in TS23.401 of 3GPP. A policy and charging rules function (PCRF) 2001 depicted in FIG. 20 is a processing unit for configuring service-dependent priority control and charging rules, connected to the packet core network 230.

For example, the PGW 232 configures UL and DL TFTs for the UE 211, stores the TFTs to a create bearer request 2002 depicted in FIG. 20, and transmits the create bearer request 2002 to the SGW 231. The SGW 231 transmits the create bearer request 2002 sent from the PGW 232, to the MME 233.

The MME 233 transmits to the eNB 221, a bearer setup request/session management request 2003 including the TFTs included in the create bearer request 2002 transmitted from the SGW 231. The TFTs are included in a session management request of the bearer setup request/session management request 2003, for example. This enables the eNB 221 to acquire the UL and DL TFTs.

The eNB 221 transmits to the UE 211, an RRC connection reconfiguration 2004 including a UL TFT among the TFTs included in the bearer setup request/session management request 2003 transmitted from the MME 233. This enables the UE 211 to acquire the UL TFT. Although the UL TFT can be defined in an RRC connection reconfiguration message, it is preferably defined in a non-access stratum (NAS) PDU transmitted in the message. The same will apply hereinafter.

In the example depicted in FIG. 18, for example, the eNB 221 can perform the packet filtering 1830 using the UL TFT acquired from the bearer setup request/session management request 2003. In the example depicted in FIG. 19, the eNB 221 transmits the UL TFT acquired from the bearer setup request/session management request 2003, to the secondary eNB 223. The secondary eNB 223 can perform the packet filtering 1830 on the basis of the UL TFT sent from the eNB 221.

Figure 21:
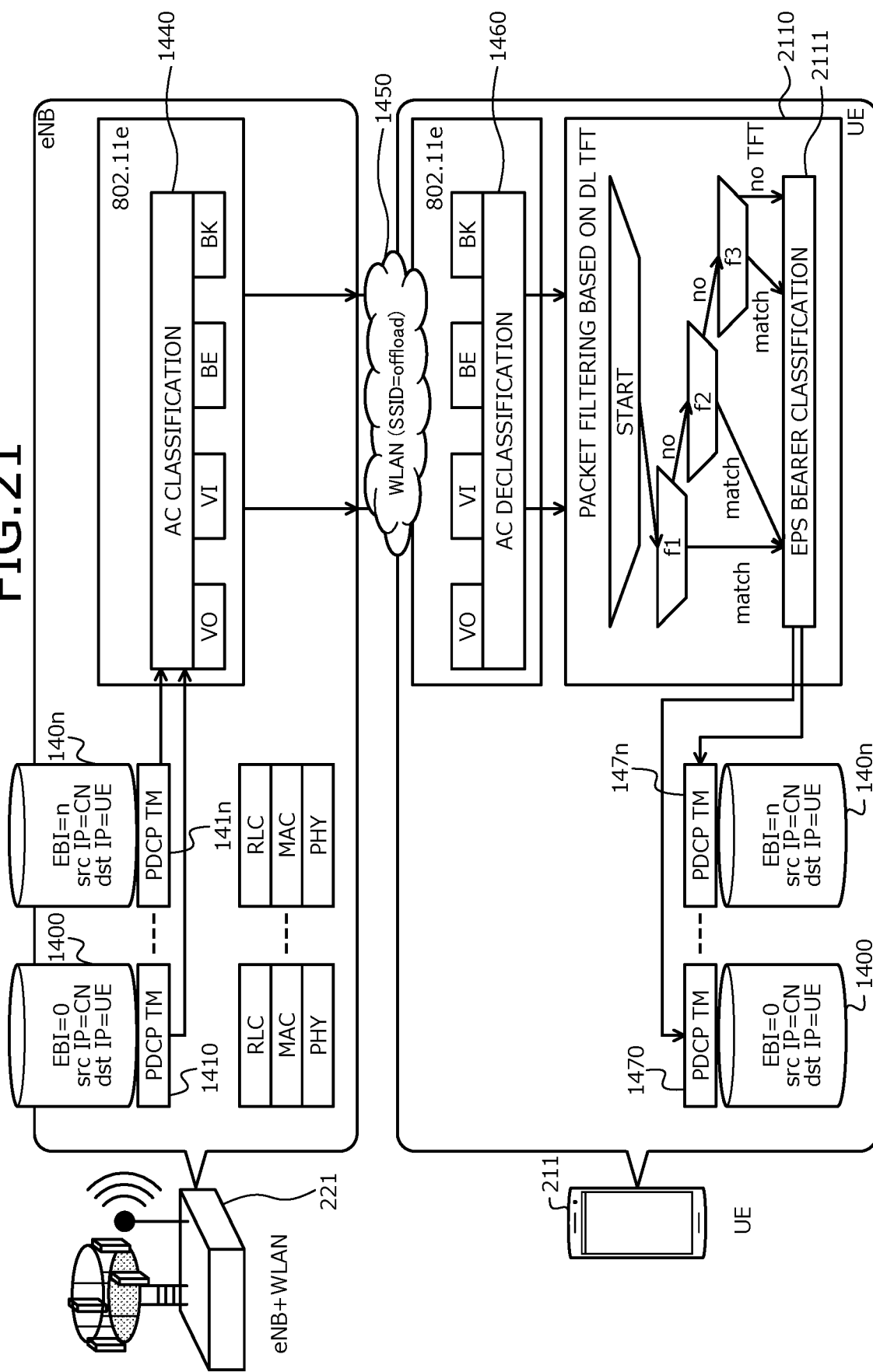
FIG. 21 is a diagram depicting an example of a method of identifying EPS bearers using a DL TFT in the wireless communications system according to the third embodiment.

FIG. 21 is a diagram depicting an example of a method of identifying EPS bearers using DL TFT in the wireless communications system according to the third embodiment. In FIG. 21, parts similar to those depicted in FIG. 14 are designated by the same reference numerals used in FIG. 14 and explanations thereof will be omitted.

In FIG. 21, a downlink case will be described where offloading to a WLAN is performed in a configuration in which the eNB 221 has a WLAN communication function (eNB+WLAN). In the example depicted in FIG. 21, the EPS bearers 1400 to 140n are downlink direction bearers from the eNB 221 toward the UE 211.

The UE 211 performs a packet filtering 2110 based on downlink (DL) TFTs, for PDCP SDUs received by the AC declassification 1460. The packet filtering 2110 effected by the UE 211 is processing based on the DL TFTs and therefore, is processing similar to the packet filtering by the filter layer 711 in the PGW 232 depicted in FIG. 7, for example.

In the packet filtering 2110, filtering is performed depending on whether (match/no) the PDCP SDUs satisfy conditions (f1 to f3) corresponding to TFTs. An EPS bearer classification 2111 identifying EPS bearers is carried out in accordance with the results of this filtering. This allows identification of EPS bearers corresponding to the offloaded PDCP SDUs.

For example, the eNB 221 stores not only the UL TFTs but also DL TFTs into the RRC connection reconfiguration 2004 destined for the UE 211, depicted in FIG. 20. This enables the UE 211 to acquire a DL TFT from the RRC connection reconfiguration 2004, to thereby perform the packet filtering 2110 based on the acquired DL TFT.

Based on the results of identification by the EPS bearer classification 2111, the UE 211 transfers the PDCP SDUs to PDCP layers corresponding to the EPS bearers of the PDCP SDUs, among the PDCP layers 1470 to 147n. As a result, the PDCP SDUs (IP flow) offloaded by a WLAN are converted into corresponding EPS bearers and transferred to the PDCP layers 1470 to 147n.

In this manner, by applying the packet filtering 2110 based on a DL TFT to the offloaded PDCP SDUs, the UE 211 can identify EPS bearers of the offloaded PDCP SDUs. For this reason, without setting the restriction that EPS bearers having the same QoS class cannot be offloaded to a WLAN at the same time, the wireless communications system 200 enables the offload to a WLAN and can achieve an increase in the amount of offloadable user data.

Figure 22:
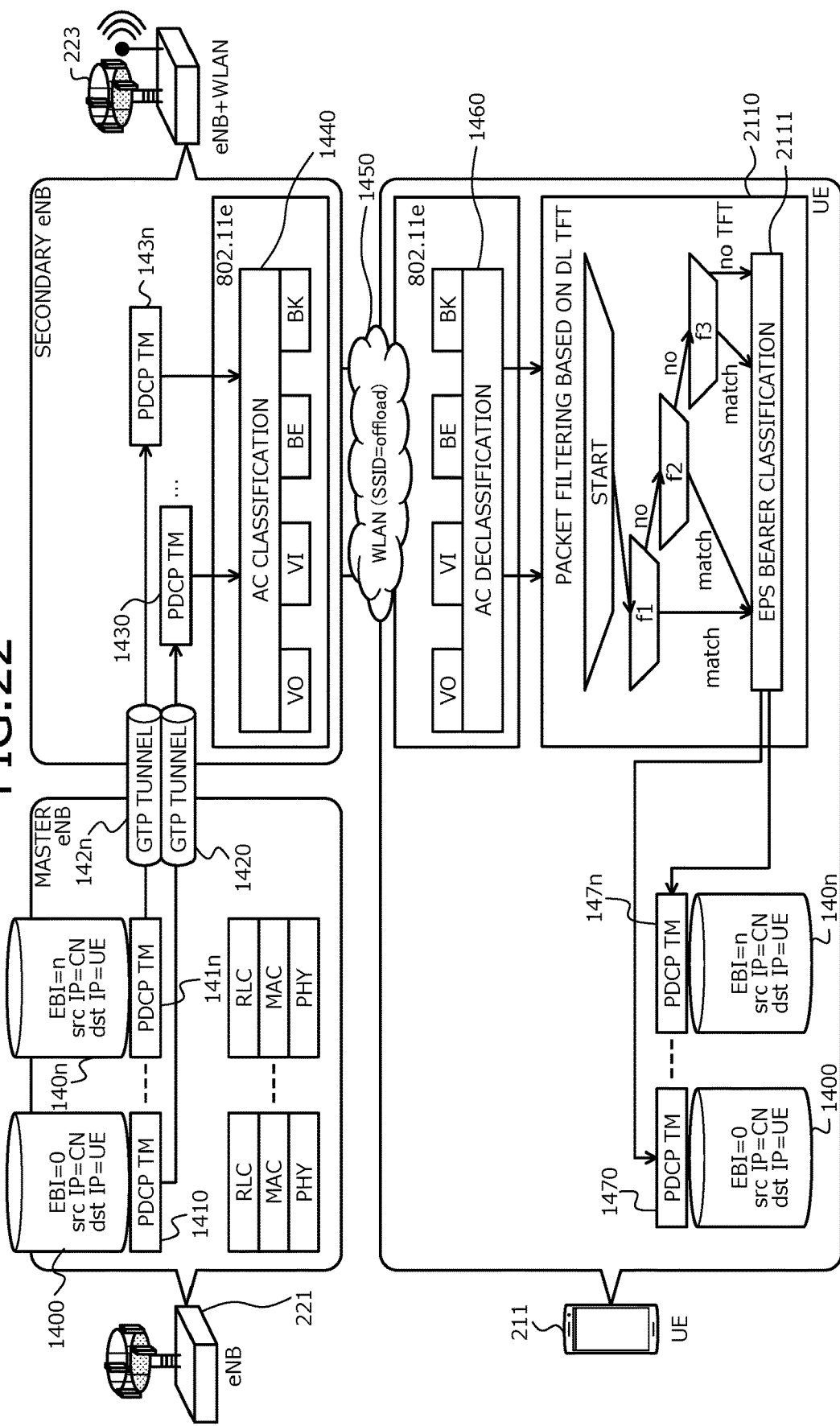
FIG. 22 is a diagram depicting another example of a method of identifying EPS bearers using a DL TFT in the wireless communications system according to the third embodiment.

FIG. 22 is a diagram depicting another example of a method of identifying EPS bearers using DL TFTs in the wireless communications system according to the third embodiment. In FIG. 22, parts similar to those depicted in FIG. 14 or 21 are designated by the same reference numerals used in FIGS. 14 and 21 and explanations thereof will be omitted.

In FIG. 22, a downlink case will be described where offloading to a WLAN is performed in the WLAN standalone configuration using the secondary eNB 223 having eNB and WLAN communication functions, with the eNB 221 serving as a master eNB. In this case, the GTP tunnels 1420 to 142n are provided for each of EPS bearers between the eNB 221 and the secondary eNB 223.

The secondary eNB 223 receives the PDCP SDUs transmitted via the WLAN 1450 from the UE 211. The secondary eNB 223 then transfers the received PDCP SDUs to the PDCP layers 1430 to 143n.

Thus, similar to the example depicted in FIG. 21, the UE 211 performs the packet filtering 2110 based on a DL TFT for the offloaded PDCP SDUs, so as to be able to identify the EPS bearers of the offloaded PDCP SDUs. For this reason, without setting the restriction that EPS bearers having the same QoS class cannot be offloaded to a WLAN at the same time, the wireless communications system 200 enables the offload to a WLAN and can achieve an increase in the amount of offloadable user data.

According to the method using the TFTs depicted in FIGS. 18 to 22, the EPS bearers can be identified without the number of offloadable EPS bearers being restricted by the bit number of the VLAN tag, as in the case of using the VLAN tag, for example. According to the method using the TFTs depicted in FIGS. 18 to 22, the EPS bearers can be identified without adding a header such as the VLAN tag to the offloaded user data.

Figure 23:
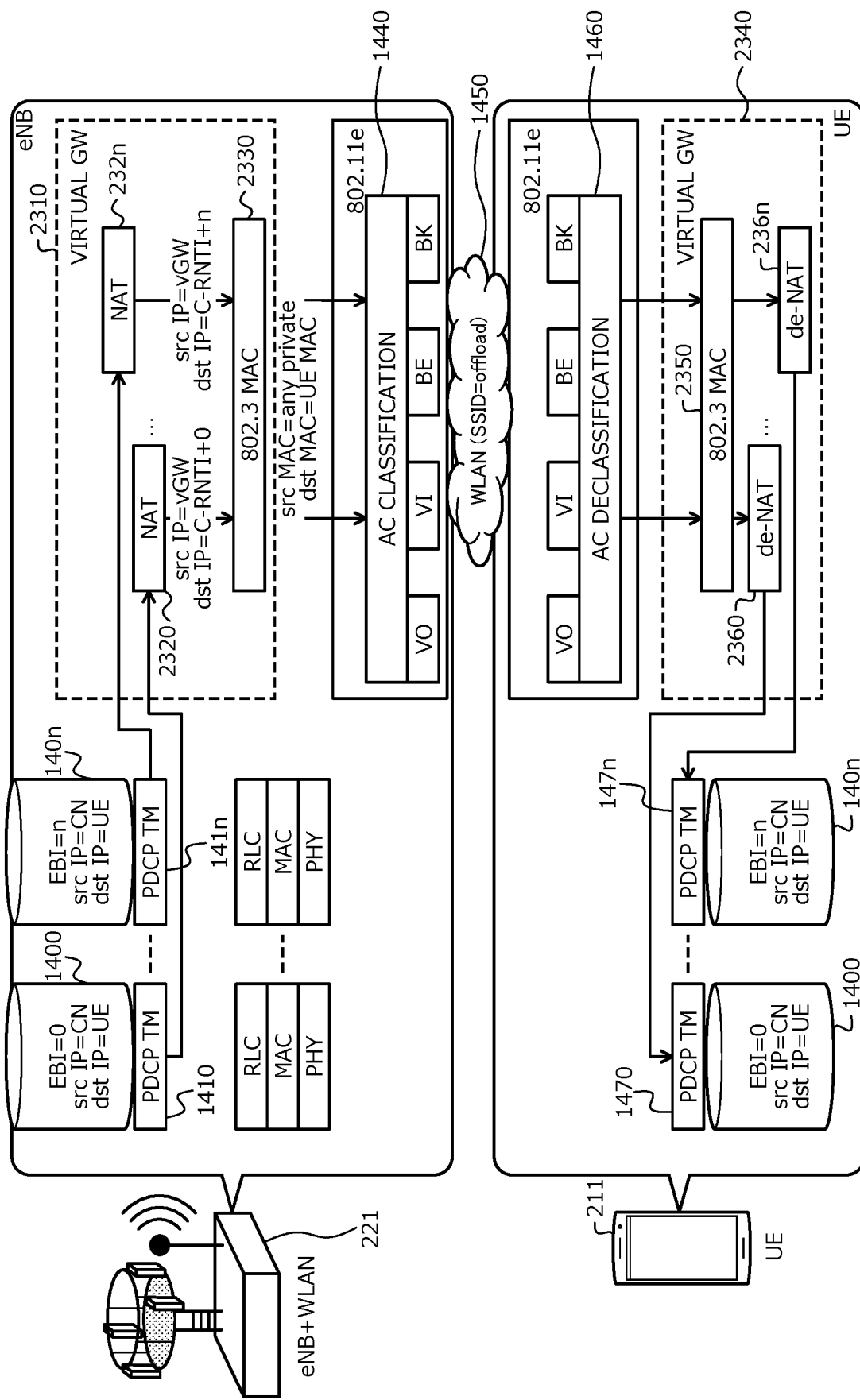
FIG. 23 is a diagram depicting an example of a method of identifying EPS bearers using a virtual IP flow in the wireless communications system according to the third embodiment.

FIG. 23 is a diagram depicting an example of a method of identifying EPS bearers using a virtual IP flow in the wireless communications system according to the third embodiment. In FIG. 23, parts similar to those depicted in FIG. 14 are designated by the same reference numerals used in FIG. 14 and explanations thereof will be omitted.

In FIG. 23, concerning downlink, a case will be described where offloading to a WLAN is performed in a configuration in which the eNB 221 has a WLAN communication function (eNB+WLAN). In the example depicted in FIG. 23, the EPS bearers 1400 to 140n are downlink direction bearers from the eNB 221 toward the UE 211.

In the example depicted in FIG. 23, a virtual GW 2310 is provided between the PDCP layers 1410 to 141n and the WLAN 1450 in the eNB 221. The virtual GW 2310 includes NAT processing units 2320 to 232n and a MAC processing unit 2330 (802.3 MAC). A virtual GW 2340 is provided between the WLAN 1450 and the PDCP layers 1470 to 147n in the UE 211. The virtual GW 2340 includes a MAC processing unit 2350 (802.3 MAC) and de-NAT processing units 2360 to 236n.

The EPS bearers 1400 to 140n passing through the transparent mode PDCP layers 1410 to 141n are transferred to the NAT processing units 2320 to 232n of the virtual GW 2310. The NAT processing units 2320 to 232n perform network address translation (NAT) processes that classify the EPS bearers 1400 to 140n, respectively, by virtual destination IP addresses into virtual IP flows. The virtual IP flow is a local virtual data flow between the eNB 221 and the UE 211 for example. The virtual destination IP address is a destination address of the virtual IP flow. The NAT processing units 2320 to 232n transfer the classified IP flows to the MAC processing unit 2330.

For example, the NAT processing units 2320 to 232n perform one-to-one mapping between the EPS bearers 1400 to 140n and the virtual destination IP addresses. Virtual source IP addresses (src IP) of the virtual IP flows transferred from the NAT processing units 2320 to 232n can be a virtual GW 2310 (vGW) for example. Virtual destination IP addresses (dst IP) of the virtual IP flows transferred from the NAT processing units 2320 to 232n can be C-RNTI+0 to C-RNTI+10, respectively, for example.

A cell-radio network temporary identifier (C-RNTI) is temporarily allocated to the UE 211 and is a unique identifier of the UE 211 within an LTE-A cell. For example, C-RNTI has a 16-bit value. As in the example depicted in FIG. 23, C-RNTI and the bearer identifiers (0 to 10) are added together to generate virtual source IP addresses, whereby the virtual source IP addresses can be prevented from occurring in duplicate. For example, in the case of using class A IP addresses, EPS bearers of about 24 bits can be identified, sufficient for offloading. Although a case has been described herein of adding C-RNTI and bearer identifiers together to generate virtual source IP addresses, the method of generating the virtual source IP addresses is not limited to the above.

The MAC processing unit 2330 converts virtual IP flows transferred from the NAT processing units 2320 to 232n, into MAC frames of Ethernet, IEEE 802.3, etc. Ethernet is a registered trademark. In this case, the source MAC addresses (src MAC) of MAC frames may be, for example, any private addresses in the virtual GWs 2310, 2340. For example, the MAC-frame source MAC addresses can be addresses with top octet of "xxxxxx10" (x represents an arbitrary value). Destination MAC addresses (dst MAC) of MAC frames can be MAC addresses (UE MAC) of the UE 211, for example.

The eNB 221 performs the AC classification 1440 for MAC frames converted by the MAC processing unit 2330 and transmits the MAC frames for which the AC classification 1440 has been performed, to the UE 211 via the WLAN 1450.

The UE 211 applies the AC declassification 1460 to the MAC frames received from the eNB 221 via the WLAN 1450. The MAC processing unit 2350 of the virtual GW 2340 receives the MAC frames for which the AC declassification 1460 has been performed, as virtual IP flows.

The de-NAT processing units 2360 to 236n convert the virtual IP flows received by the MAC processing unit 2350 into EPS bearers, by referring to virtual destination IP addresses (dst IP) of the virtual IP flows. At this time, the virtual destination IP addresses of the virtual IP flows are converted into original IP addresses by de-NAT by the de-NAT processing units 2360 to 236n.

In this manner, by providing the virtual GWs 2310 and 2340 in the eNB 221 and the UE 211, respectively, and by utilizing NAT, the EPS bearers can be identified as virtual IP flows at the virtual GWs 2310, 2340. The IP addresses and the MAC addresses can be in the form of private space addresses. By building a virtual IP network between the virtual GWs 2310 and 2340 in this manner, EPS bearers of the offloaded PDCP SDUs can be identified. For this reason, without setting the restriction that EPS bearers having the same QoS class cannot be offloaded to a WLAN at the same time, the wireless communications system 200 enables the offload to a WLAN and can achieve an increase in the amount of offloadable user data.

Although the downlink has been described in FIG. 23, a similar method is applicable to the uplink, for the identification of EPS bearers. That is, by building a virtual IP network between the virtual GWs 2310 and 2340 configured in the eNB 221 and UE 211, EPS bearers of PDCP SDUs offloaded in the uplink can be identified.

Figure 24:
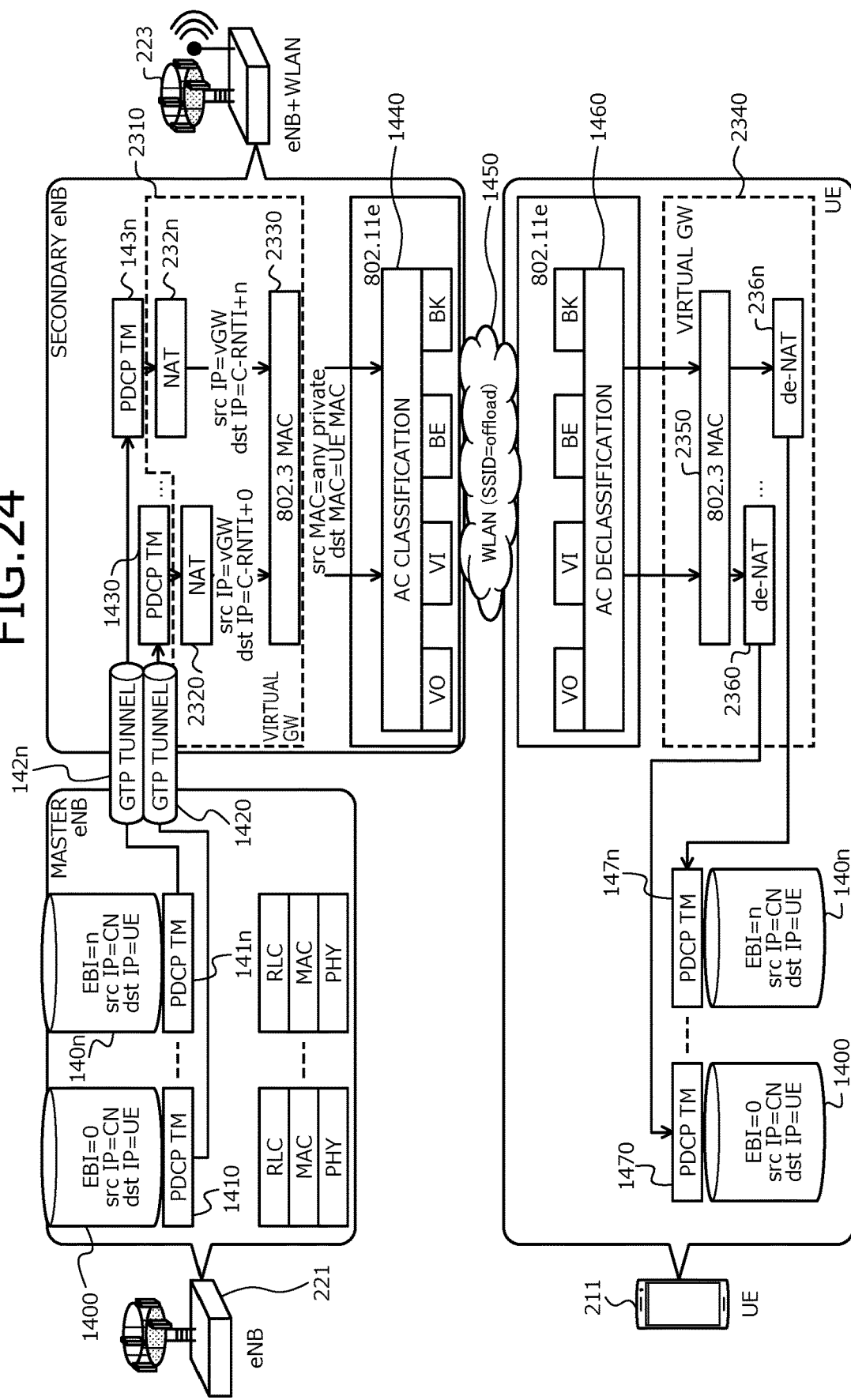
FIG. 24 is a diagram depicting another example of a method of identifying EPS bearers using virtual IP flow in the wireless communications system according to the third embodiment.

FIG. 24 is a diagram depicting another example of a method of identifying EPS bearers using virtual IP flow in the wireless communications system according to the third embodiment. In FIG. 24, parts similar to those depicted in FIG. 14 or 23 are designated by the same reference numerals used in FIGS. 14 and 21 and explanations thereof will be omitted.

In FIG. 24, concerning downlink, a case will be described where offloading to a WLAN is performed in the WLAN standalone configuration using the secondary eNB 223 having eNB and WLAN communication functions, with the eNB 221 serving as a master eNB. In this case, the GTP tunnels 1420 to 142n are provided for each of EPS bearers between the eNB 221 and the secondary eNB 223.

The NAT processing units 2320 to 232n depicted in FIG. 23 are established in the secondary eNB 223 in an example depicted in FIG. 24. The secondary eNB 223 receives PDCP SDUs transmitted from the UE 211 via the WLAN 1450.

The secondary eNB 223 then transfers the received PDCP SDUs to the NAT processing units 2320 to 232n of the virtual GW 2310.

Similar to the example depicted in FIG. 23, this enables the EPS bearers to be identified as virtual IP flows in the virtual GWs 2310, 2340. Thus, without setting the restriction that EPS bearers having the same QoS class cannot be offloaded to a WLAN at the same time, the wireless communications system 200 enables the offload to a WLAN and can achieve an increase in the amount of offloadable user data.

Although the downlink has been described in FIG. 24, a similar method is applicable to the uplink, for identification of EPS bearers. That is, by building a virtual IP network between the virtual GWs 2310 and 2340 configured in the eNB 221 and UE 211, EPS bearers of PDCP SDUs offloaded in the uplink can be identified.

According to the method using the virtual IP flows depicted in FIGS. 23 and 24, the EPS bearers may be identified without the number of offloadable EPS bearers being restricted by the bit number of the VLAN tag, as in the case of using the VLAN tag, for example. According to the method using the virtual IP flows depicted in FIGS. 23 and 24, connection between the eNB 221 and the secondary eNB 223 is possible by Ethernet, etc. and is not limited to the GTP tunnels.

According to the method using the virtual IP flows depicted in FIGS. 23 and 24, the EPS bearers can be identified without configuring a DL TFT in the UE 211 or without configuring a UL TFT in the eNB 221. According to the method using the virtual IP flows depicted in FIGS. 23 and 24, the EPS bearers can be identified without adding a header such as the VLAN tag to the offloaded user data.

Figure 25:
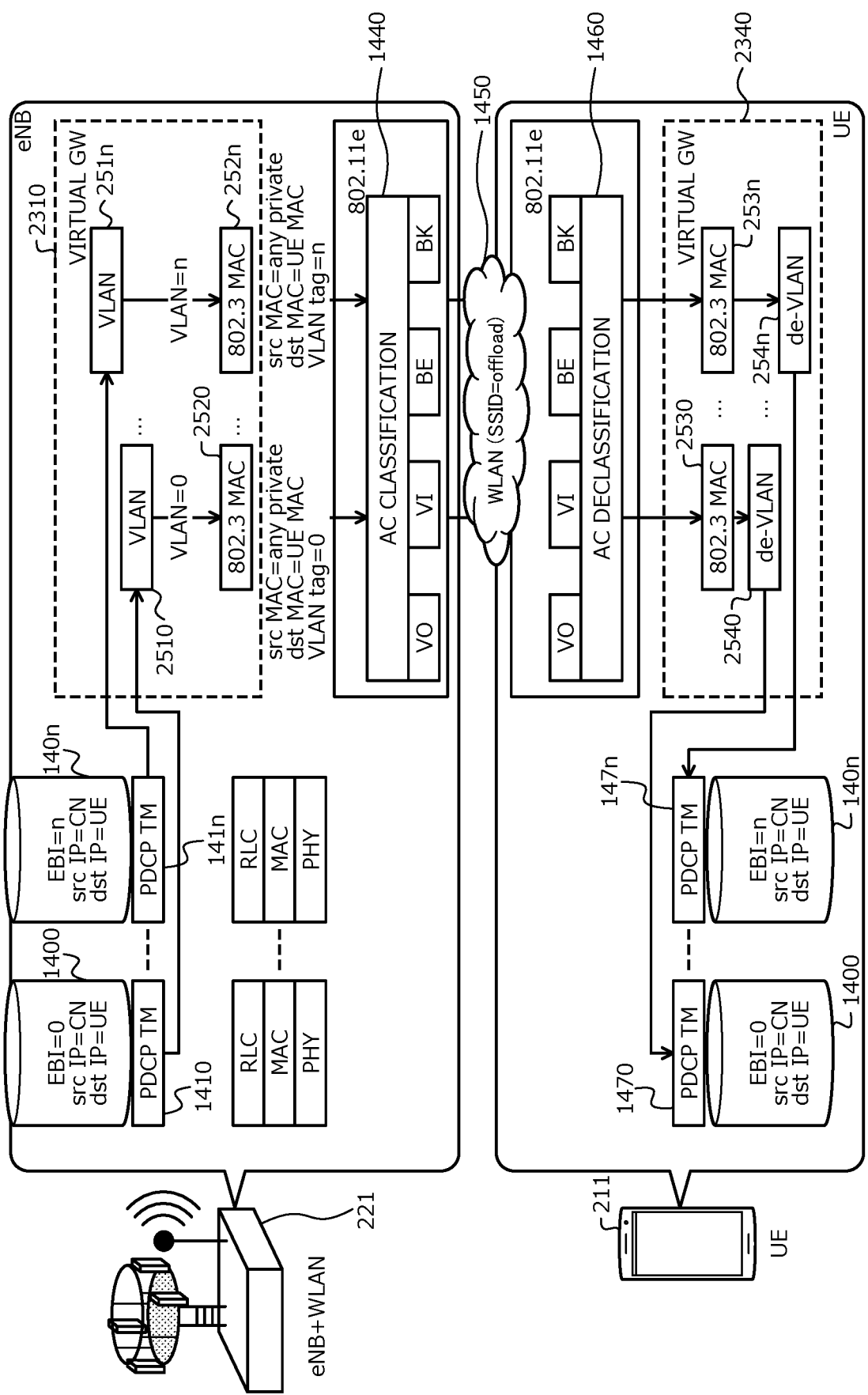
FIG. 25 is a diagram depicting an example of a method of identifying EPS bearers using a VLAN in the wireless communications system according to the third embodiment.

FIG. 25 is a diagram depicting an example of a method of identifying EPS bearers using VLAN in the wireless communications system according to the third embodiment. In FIG. 25, parts similar to those depicted in FIG. 14 or 23 are designated by the same reference numerals used in FIGS. 14 and 23 and explanations thereof will be omitted. Although the method of identifying EPS bearers by building the virtual IP network has been described in FIG. 23, a method of identifying EPS bearers by VLAN virtualizing Ethernet will be described in FIG. 25.

In FIG. 25, concerning downlink, a case will be described where offloading to a WLAN is performed in a configuration in which the eNB 221 has a WLAN communication function (eNB+WLAN). In this case, the EPS bearers 1400 to 140n are downlink direction bearers from the eNB 221 to the UE 211.

In the example depicted in FIG. 25, similar to the example depicted in FIG. 23, the virtual GWs 2310 and 2340 are established in the eNB 221 and the UE 211, respectively. It is to be noted that in the example depicted in FIG. 25, the virtual GW 2310 of the eNB 221 includes VLAN processing units 2510 to 251n and MAC processing units 2520 to 252n (802.3 MAC). The virtual GW 2340 of the UE 211 includes MAC processing units 2530 to 253n (802.3 MAC) and de-VLAN processing units 2540 to 254n.

The EPS bearers 1400 to 140n passing through the transparent mode PDCP layers 1410 to 141n are transferred to the VLAN processing units 2510 to 251n of the virtual GW 2310. The VLAN processing units 2510 to 251n classify the EPS bearers 1400 to 140n, respectively, by VLAN into local IP flows between the eNB 221 and the UE 211, and transfer the classified IP flows to the MAC processing units 2520 to 252n.

For example, the VLAN processing units 2510 to 251n perform one-to-one mapping between the EPS bearers 1400 to 140n and the VLAN tags. VLAN identifiers of the IP flows transferred from the VLAN processing units 2510 to 251n can be 0 to 10, respectively.

The MAC processing units 2520 to 252n convert the IP flows transferred from the VLAN processing units 2510 to 251n, respectively, into MAC frames of Ethernet, IEEE 802.3, etc. The source MAC addresses (src MAC) of MAC frames converted by the MAC processing units 2520 to 252n can be, for example, any private addresses in the virtual GWs 2310, 2340. For example, the MAC-frame source MAC addresses can be addresses with top octet of "xxxxxx10" (x represents an arbitrary value). The destination MAC addresses (dst MAC) of MAC frames converted by the MAC processing units 2520 to 252n can be MAC addresses (UE MAC) of the UE 211, for example.

The VLAN tags of MAC frames converted by the MAC processing units 2520 to 252n can be, for example, 0 to 10 corresponding to the respective EPS bearers. In this manner, a VLAN tag for each EPS bearer is applied to each of the MAC frames. The VLAN tag is a 12-bit tag, for example. Thus, a maximum of 4094 VLANs can be built between the virtual GWs 2210 and 2340. Provided that the UEs including the UE 211 provide all the EPS bearers and that all the EPS bearers are offloaded, about 372 UEs can be accommodated in WLAN. Note that since the actual possibility that communication using all the EPS bearers is low, use of VLAN enables a sufficient number of EPS bearers to be offloaded.

The eNB 221 performs the AC classification 1440 for MAC frames with VLAN tags converted by the MAC processing units 2520 to 252n. The eNB 221 then transmits the MAC frames with VLAN tags for which the AC classification 1440 has been performed, to the UE 211 via the WLAN 1450.

The UE 211 applies the AC declassification 1460 to the MAC frames with VLAN tags received via the WLAN 1450 from the eNB 221. The MAC processing units 2530 to 253n of the virtual GW 2340 are MAC processing units corresponding to the EPS bearers 1400 to 140n, respectively. Each of the MAC processing units 2530 to 253n refers to the VLAN tag added to the MAC frame for which the AC declassification 1460 has been performed, to thereby receive a MAC frame of a corresponding EPS bearer as an IP flow.

The de-VLAN processing units 2540 to 254n convert the IP flows received by the MAC processing units 2530 to 253n, respectively, into EPS bearers 1400 to 140n. The PDCP layers 1470 to 147n process the EPS bearers 1400 to 140n converted by the de-VLAN processing units 2540 to 254n, respectively.

In this manner, by configuring the VLAN for each of the EPS bearers between the virtual GWs 2310 and 2340, EPS bearers of offloaded PDCP SDUs can be identified. For this reason, without setting the restriction that EPS bearers having the same QoS class cannot be offloaded to a WLAN at the same time, the wireless communications system 200 enables the offload to a WLAN and can achieve an increase in the amount of offloadable user data.

Although the downlink has been described in FIG. 25, a similar method is applicable to the uplink, for identification of EPS bearers. That is, by configuring the VLAN for each of the EPS bearers between the virtual GWs 2310 and 2340 configured in the eNB 221 and the UE 211, EPS bearers of PDCP SDUs offloaded in the uplink can be identified.

Figure 26:
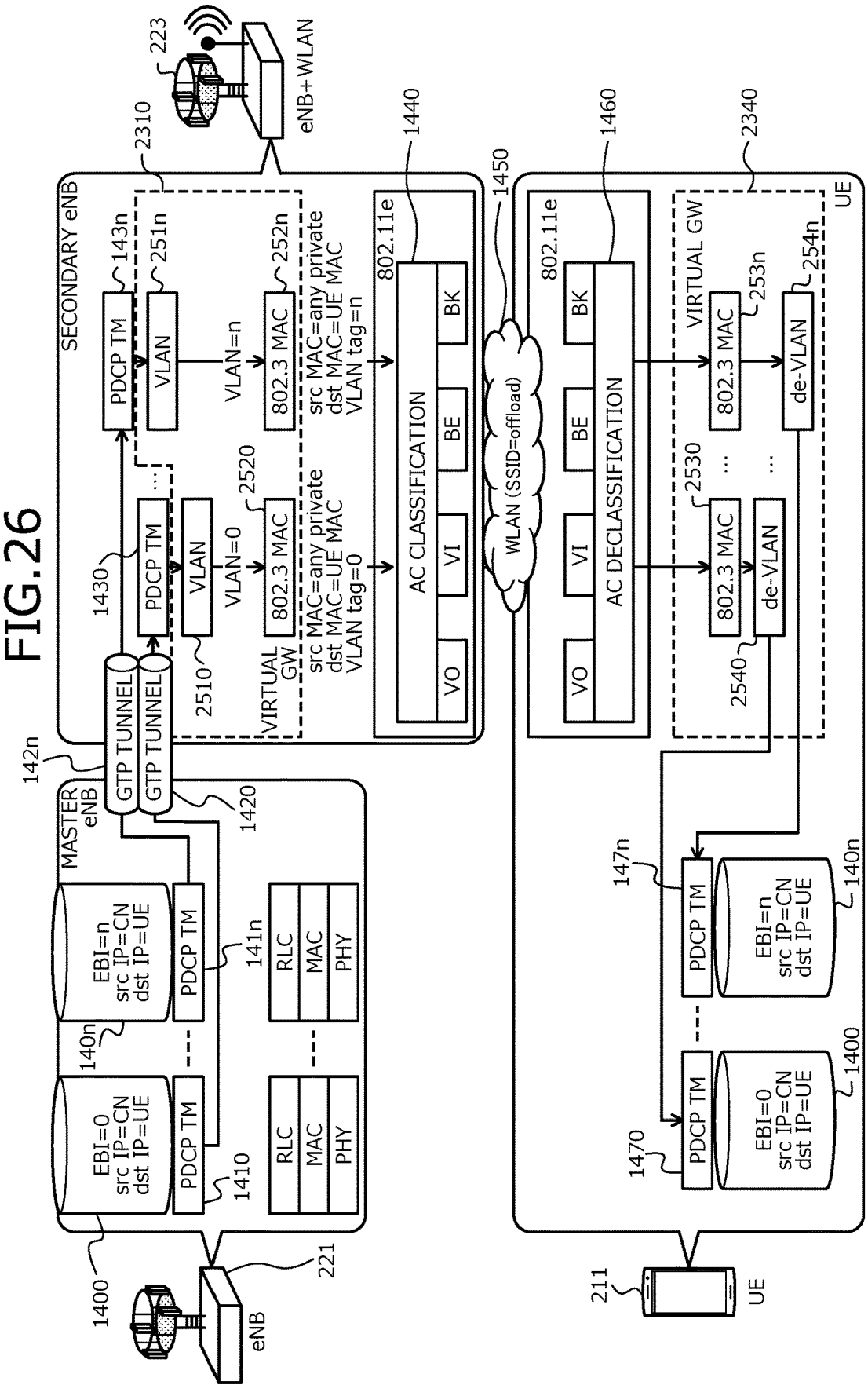
FIG. 26 is a diagram depicting another example of a method of identifying EPS bearers using a VLAN in the wireless communications system according to the third embodiment.

FIG. 26 is a diagram depicting another example of a method of identifying EPS bearers using VLAN in the wireless communications system according to the third embodiment. In FIG. 26, parts similar to those depicted in FIG. 14 or 25 are designated by the same reference numerals used in FIGS. 14 and 25 and explanations thereof will be omitted.

In FIG. 26, concerning downlink, a case will be described where offloading to a WLAN is performed in the WLAN standalone configuration using the secondary eNB 223 having eNB and WLAN communication functions, with the eNB 221 serving as a master eNB. In this case, the GTP tunnels 1420 to 142$n$ are provided for each of EPS bearers between the eNB 221 and the secondary eNB 223.

The VLAN processing units 2510 to 251$n$ depicted in FIG. 25 are equipped in the secondary eNB 223 in an example depicted in FIG. 26. The secondary eNB 223 receives PDCP SDUs transmitted from the UE 211 via the WLAN 1450. The secondary eNB 223 then transfers the received PDCP SDUs to the VLAN processing units 2510 to 251$n$ of the virtual GW 2310.

Similar to the example depicted in FIG. 25, this makes it possible for the EPS bearers to be identified as virtual IP flows in the virtual GWs 2310, 2340. Thus, without setting the restriction that EPS bearers having the same QoS class cannot be offloaded to a WLAN at the same time, the wireless communications system 200 enables the offload to a WLAN and can achieve an increase in the amount of offloadable user data.

Although the downlink has been described in FIG. 26, a similar method is applicable to the uplink, for identification of EPS bearers. That is, by configuring a VLAN for each EPS bearer between the virtual GWs 2310 and 2340 configured in the eNB 221 and UE 211, EPS bearers of PDCP SDUs offloaded in the uplink can be identified.

According to the method using the VLAN depicted in FIGS. 25 and 26, connection between the eNB 221 and the secondary eNB 223 is possible by Ethernet, etc. and is not limited to the GTP tunnels. According to the method using the VLAN depicted in FIGS. 25 and 26, EPS bearers of PDCP SDUs can be identified by adding the VLAN tag without packet processing referring to the IP header in WLAN. According to the method using the VLAN depicted in FIGS. 25 and 26, EPS bearers can be identified without configuring the DL TFT in the UE 211 or without configuring the UL TFT in the eNB 221.

Figure 27:
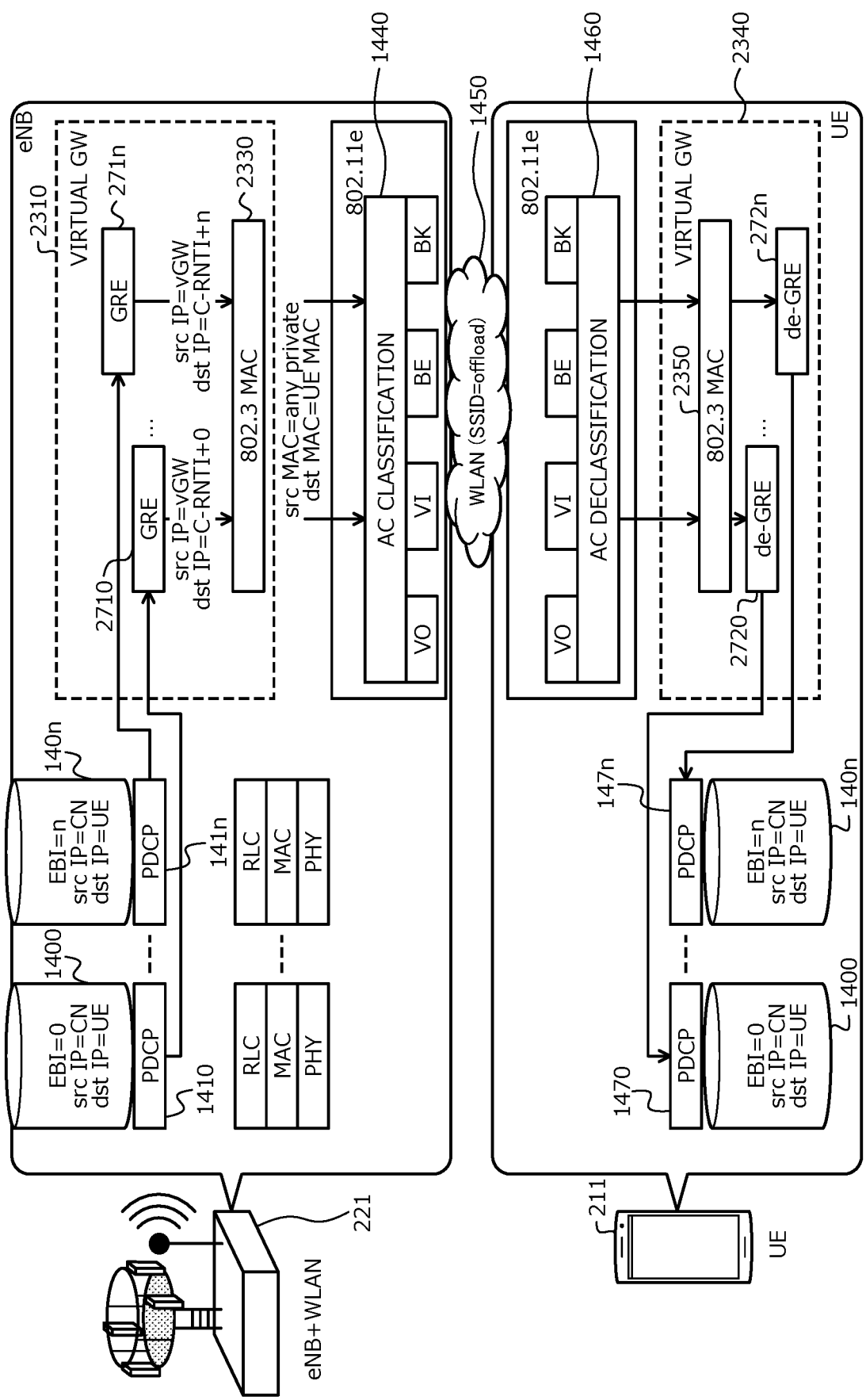
FIG. 27 is a diagram depicting an example of a method of identifying EPS bearers using GRE tunneling in the wireless communications system according to the third embodiment.

FIG. 27 is a diagram depicting an example of a method of identifying EPS bearers using GRE tunneling in the wireless communications system according to the third embodiment. In FIG. 27, parts similar to those depicted in FIG. 14 or 23 are designated by the same reference numerals used in FIGS. 14 and 23 and explanations thereof will be omitted.

In FIG. 27, concerning downlink, a case will be described where offloading to a WLAN is performed in a configuration in which the eNB 221 has a WLAN communication function (eNB+WLAN). In the example depicted in FIG. 27, the EPS bearers 1400 to 140$n$ are downlink direction bearers from the eNB 221 toward the UE 211.

In the example depicted in FIG. 27, the virtual GW 2310 is provided between the PDCP layers 1410 to 141$n$ and the WLAN 1450 in the eNB 221. The virtual GW 2310 includes GRE processing units 2710 to 271$n$ and the MAC processing unit 2330 (802.3 MAC). The virtual GW 2340 is provided between the WLAN 1450 and the PDCP layers 1470 to 147$n$ in the UE 211. The virtual GW 2340 includes the MAC processing unit 2350 (802.3 MAC) and de-GRE processing units 2720 to 272$n$.

The EPS bearers 1400 to 140$n$ passing through the transparent mode PDCP layers 1410 to 141$n$ are transferred to the GRE processing units 2710 to 271$n$ of the virtual GW 2310. The GRE processing units 2710 to 271$n$ classifies the EPS bearers 1400 to 140$n$, respectively, by applying generic routing encapsulation (GRE) tunneling to local IP flows between the eNB 221 and the UE 211, and transfers the classified IP flows to the MAC processing unit 2330.

For example, the GRE processing units 2710 to 271$n$ add GRE headers and then IP headers to PDCP SDUs corresponding to the EPS bearers 1400 to 140$n$ and transfers them as IP flows to the MAC processing unit 2330. The source IP addresses (src IP) of the IP flows transferred from the GRE processing units 2710 to 271$n$ can be the virtual GW (vGW) 2310, for example. The destination IP addresses (dst IP) of the IP flows transferred from the GRE processing units 2710 to 271$n$ may be for example C-RNTI+0 to C-RNTI+10, respectively.

Similar to the example depicted in FIG. 23 for example, the MAC processing unit 2330 converts the IP flows transferred from the GRE processing units 2710 to 271$n$, into MAC frames of Ethernet (IEEE 802.3).

The eNB 221 applies the AC classification 1440 to the MAC frames converted by the MAC processing unit 2330 and transmits the MAC frames for which the AC classification 1440 has been performed, to the UE 211 via the WLAN 1450. This enables user data to be transmitted through a GRE tunnel (encapsulated tunnel) of the WLAN provided between the eNB 221 and the UE 211.

The UE 211 applies the AC declassification 1460 to the MAC frames received via the WLAN 1450 from the eNB 221. Similar to the example depicted in FIG. 23 for example, the MAC processing unit 2350 of the virtual GW 2340 receives, as IP flows, the MAC frames for which the AC declassification 1460 has been performed.

The de-GRE processing units 2720 to 272$n$ refer to destination IP addresses (dst IP) included in IP headers of the IP flows received by the MAC processing unit 2350 and thereby convert the IP flows into EPS bearers.

In this manner, by configuring the virtual GWs 2310 and 2340 in the eNB 221 and the UE 211, respectively, and by utilizing the GRE tunneling, the EPS bearers can be identified as IP flows at the virtual GWs 2310, 2340. The IP addresses and the MAC addresses can be in the form of private space addresses. By building the GRE tunnel between the virtual GWs 2310 and 2340 in this manner, EPS bearers of the offloaded PDCP SDUs can be identified. For this reason, without setting the restriction that EPS bearers having the same QoS class cannot be offloaded to a WLAN at the same time, the wireless communications system 200 enables the offload to a WLAN and can achieve an increase in the amount of offloadable user data.

Although the downlink has been described in FIG. 27, the similar method is applicable to the uplink, for identification of EPS bearers. That is, by building the GRE tunnel between the virtual GWs 2310 and 2340, EPS bearers of PDCP SDUs offloaded in the uplink can be identified.

Figure 28:
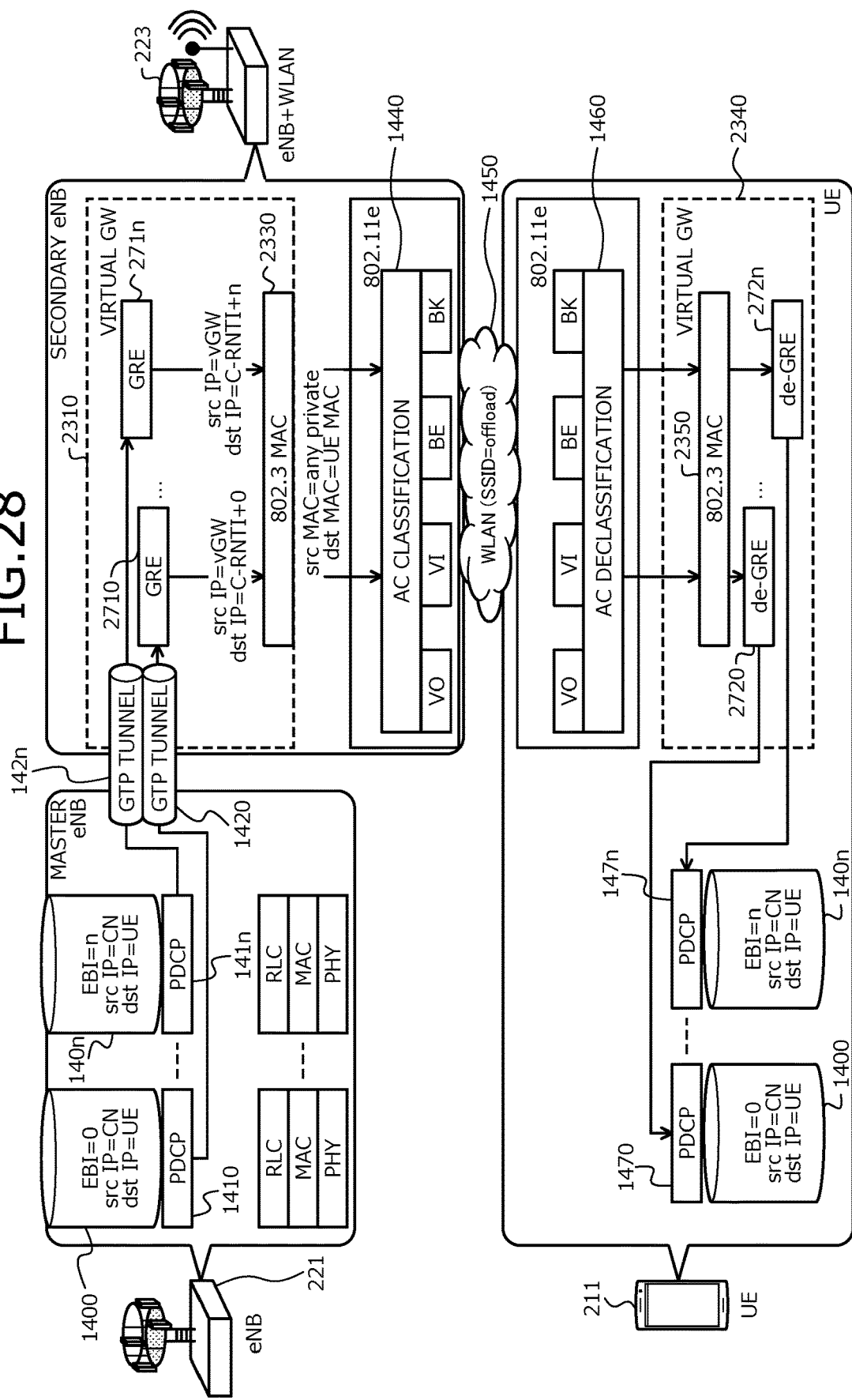
FIG. 28 is a diagram depicting another example of a method of identifying EPS bearers using GRE tunneling in the wireless communications system according to the third embodiment.

FIG. 28 is a diagram depicting another example of a method of identifying EPS bearers using GRE tunneling in the wireless communications system according to the third embodiment. In FIG. 28, parts similar to those depicted in FIG. 14 or 27 are designated by the same reference numerals used in FIGS. 14 and 27 and explanations thereof will be omitted.

In FIG. 28, concerning downlink, a case will be described where offloading to a WLAN is performed in the WLAN standalone configuration using the secondary eNB 223 having eNB and WLAN communication functions, with the eNB 221 serving as a master eNB. In this case, the GTP tunnels 1420 to 142*n* are provided for each of EPS bearers between the eNB 221 and the secondary eNB 223.

The secondary eNB 223 receives PDCP SDUs transmitted from the UE 211 via the WLAN 1450. The secondary eNB 223 then transfers the received PDCP SDUs to the GRE processing units 2710 to 271*n*.

As a result, similar to the example depicted in FIG. 27, the UE 211 can identify EPS bearers of the offloaded PDCP SDUs by utilizing the GRE tunneling. Thus, without setting the restriction that EPS bearers having the same QoS class cannot be offloaded to a WLAN at the same time, the wireless communications system 200 enables the offload to a WLAN and can achieve an increase in the amount of offloadable user data.

According to the method using the GRE tunneling depicted in FIGS. 27 and 28, the EPS bearers can be identified without the number of offloadable EPS bearers being restricted by the bit number of the VLAN tag, as in the case of using the VLAN tag, for example. According to the method using the GRE tunneling depicted in FIGS. 27 and 28, connection between the eNB 221 and the secondary eNB 223 is possible by Ethernet, etc. and is not limited to the GTP tunnels.

According to the method using GRE tunneling depicted in FIGS. 27 and 28, the EPS bearers can be identified without configuring a DL TFT in the UE 211 or without configuring a UL TFT in the eNB 221. According to the method using GRE tunneling depicted in FIGS. 27 and 28, the EPS bearers can be identified without adding a header such as the VLAN tag to the offloaded user data.

In this manner, according to the third embodiment, the offload to WLAN becomes possible without setting the restriction that EPS bearers having the same QoS class cannot be offloaded to a WLAN at the same time. For this reason, an increase in the amount of offloadable user data can be achieved.

In the downlink from the eNB 221 to the UE 211, user data received as radio bearers by the UE 211 may be forwarded to an upper layer (e.g. an application layer) of the UE 211 without conversion to bearers. In such a case, even though plural EPS bearers have the same QoS class, the offload to a WLAN can be performed without the UE 211 identifying the bearers.

As described above, according to the wireless communications system, the base station, and the mobile station, it is possible to suppress decreases in communication quality or to maintain the communication quality.

Although it is conceivable that all traffic are be best effort, for example, when the ToS field cannot be referred to in offloading to a WLAN, it is impossible in this case to provide QoS control in accordance with the property of the traffic. For example, VoLTE traffic also results in best effort whereby the VoLTE communication quality becomes degraded.

On the contrary, according to the embodiments described above, PDCP of LTE-A is set in the transparent mode in offloading to a WLAN, thereby making it possible in the WLAN to refer to the ToS field and to provide QoS control in accordance with traffic characteristics. For example, the VoLTE traffic is classified into voice (VO) so as to allow preferential WLAN transmission to improve the VoLTE communication quality.

Under 3GPP LTE-A, also taking into account fifth generation mobile communication, in order to handle increasing mobile traffic and improve user experience, the study of an enhanced system is advancing so as to enable cellular communication in conjunction with other wireless systems.

A particular issue is cooperation with a WLAN that is widely implemented not only in households and companies but also in smartphones.

In LTE Release 8, a technique of offloading user data to WLAN in an LTE-A core network has been standardized. In LTE Release 12, offloading has become possible taking into consideration WLAN wireless channel utilization rate or user inclination to offload. Dual connectivity for concurrent transmission of user data through aggregation of frequency carriers between LTE-A base stations has also been standardized.

In LTE-A Release 13, study of license assisted access (LAA), which is a wireless access scheme utilizing an unlicensed frequency band, has been initiated. LAA is a technique of layer 1 and is a carrier aggregation of the unlicensed frequency band and a licensed frequency band in LTE-A and controls wireless transmission of the unlicensed frequency band by LTE-A control channel.

Unlike LAA, standardization is also about to start for aggregating LTE-A and WLAN by the layer 2 to perform cooperative cellular communication. This is called LTE-WLAN aggregation. The LTE-WLAN aggregation has the following advantages as compared to the methods described above.

In the offload technology in the core network, high-speed offloading according to the LTE-A radio quality is difficult, bringing about overhead of the control signal sent to the core network in the case of offloading. Since the offload is carried out by the LTE-A layer 2 in the LTE-WLAN aggregation, the LTE-A radio quality can be rapidly reflected and control signals to the core network are unnecessary.

Although high-speed offloading in aligning with the LTE-A radio quality is possible in LAA, offloading in cooperation with WLANs other than those of the LTE-A base stations is difficult. On the contrary, in LTE-WLAN aggregation, cooperative offloading becomes possible by connecting the LTE-A base stations and already configured WLAN access points on the layer 2 level.

Currently, standardization is about to be promoted assuming not only a scenario that WLANs are incorporated into the LTE-A base stations, but also a scenario that the WLANs are independent. In this case, it becomes important to identify a LTE-A call (bearer) on the WLAN side and to establish a layer 2 configuration enabling user data transmission taking the QoS class of the LTE bearers into account. To this end, it is necessary to ensure LTE-A backward compatibility and not to impact to the WLAN specifications. In this regard, for example, although a method of encapsulating IP flows before reaching the layer 2 is also conceivable, the configuration of the layer 2 enabling the LTE-A bearers to be identified on the WLAN side leaves room for consideration.

According to the embodiments set forth hereinabove, offloading to a WLAN becomes possible taking the QoS classes of the LTE bearers into account, by contriving the PDCP processing in the LTE-A layer 2.

Although in the above embodiments, the processing setting PDCP in the LTE-A layer 2 into the transparent mode has been described, other methods are also possible. For example, for offloaded data, while performing processing such as ciphering for PDCP, an IP header of data prior to the processing such as ciphering may be added to the beginning of data for which the processing such as ciphering has been performed. This enables QoS information included in the IP header of data previous to the processing such as ciphering to be referred to in a WLAN, to provide transmission control based on the QoS information.

In the above conventional techniques, however, it may become impossible to refer to QoS information included in data in a WLAN when, for example, ciphering or other processes by PDCP, etc. are performed for the data header when offloading LTE data to WLAN through LTE wireless control. Consequently, data transmission control based on QoS information in WLAN may become difficult, resulting in reduced communication quality during offloading to a WLAN.

According to one aspect of the present invention, an effect is achieved in that decreases in communication quality can be suppressed or the communication quality can be maintained.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A wireless communications system comprising:
a base station configured to control a first wireless communication and a second wireless communication different from a first wireless communication; and
a mobile station configured to perform data transmission between the mobile station and the base station, using at least one of the first wireless communication and the second wireless communication, wherein
when data is transmitted between the base station and the mobile station using the second wireless communication, a sender station that is the base station or the mobile station performs transmission control by identifying an access category of a bearer by using an identifier of the bearer of the data transmitted to a receiver station that is the base station or the mobile station and mapping information between the identifier and the access category in the second wireless communication, the mapping information being configured by Radio Resource Control (RRC), wherein the bearer has a correspondence relationship with a tunnel of a General Packet Radio System (GPRS) tunneling protocol (GTP), and wherein
the base station is configured to perform routing of the data by using a PDCP layer as a convergence point, and the GTP is used to transfer the data when the base station uses the second wireless communication to communicate with the mobile station.

2. The wireless communications system according to claim 1, wherein
the sender station transmits to the receiver station, the data with information that is based on the identifier of the bearer of the data.

3. The wireless communications system according to claim 1, further comprising
a processor for performing the first wireless communication at the sender station configured to aggregate a plurality of bearers between the base station and the mobile station and transmit the data to the receiver station by the aggregated bearers, the aggregated bearers having the same access category.

4. The wireless communications system according to claim 1, wherein the controller is configured to control transmission of the data to the receiver station in such a manner as to prevent transmission using the second wireless communication, data of each of a plurality of bearers that are between the base station and the mobile station and have the same access category.

5. The wireless communications system according to claim 1, wherein
when data from the base station is transmitted to the mobile station using the second wireless communication, the mobile station processes received data using the second wireless communication, without identifying a bearer corresponding to the data among bearers of the first wireless communication between the base station and the mobile station.

6. The wireless communications system according to claim 1, wherein
when data from the mobile station is transmitted to the base station using the second wireless communication, the base station is configured to perform packet filtering to the data received using the second wireless communication, the packet filtering using a traffic flow template in an uplink from the mobile station to the base station, to thereby identify a bearer corresponding to the received data among bearers of the first wireless communication between the base station and the mobile station.

7. The wireless communications system according to claim 1, wherein
when data is transmitted between the base station and the mobile station using the second wireless communication:
a virtual gateway of the sender station is configured to respectively classify bearers of the first wireless communication between the base station and the mobile station by virtual destination address into virtual data flows of the second wireless communication configured between the base station and the mobile station and to transmit the data by one of the virtual data flows configured between the base station and the mobile station, and
a virtual gateway of the receiver station is configured to identify a bearer corresponding to received data among the bearers of the first wireless communication between the base station and the mobile station, by the virtual destination address of the virtual data flow receiving the data.

8. The wireless communications system according to claim 1, wherein
when data is transmitted between the base station and the mobile station using the second wireless communication:
a virtual gateway of the sender station is configured to respectively classify bearers of the first wireless communication between the base station and the mobile station by virtual local area networks into virtual data flows of the second wireless communication configured between the base station and the mobile station and to transmit the data by one of the virtual local area networks configured between the base station and the mobile station, and
a virtual gateway of the receiver station is configured to identify a bearer corresponding to received data among the bearers of the first wireless communication between the base station and the mobile station, by an identifier of the virtual local area network receiving the data.

9. The wireless communications system according to claim 1, wherein
when data is transmitted between the base station and the mobile station using the second wireless communication:
a virtual gateway of the sender station is configured to respectively classify bearers of the first wireless communication between the base station and the mobile station by virtual destination addresses into generic routing encapsulation tunnels of the second wireless communication configured between the base station and the mobile station and to transmit the data by one of the tunnels configured between the base station and the mobile station, and
a virtual gateway of the receiver station is configured to identify identifies a bearer corresponding to received data among the bearers of the first wireless communication configured between the base station and the mobile station, by a virtual destination address of the generic routing encapsulation tunnel receiving the data.

10. The wireless communications system according to claim 1, wherein the access category is voice, video, best effort or background.

11. A mobile station configured to perform data transmission, between the mobile station and a base station configured to control a second wireless communication by a controller configured to control a first wireless communication, the mobile station comprising:
a transmitter configured to transmit a data using at least one of a first wireless communication and a second wireless communication different from the first wireless communication,
a processor configured to perform transmission control, wherein when the data is transmitted from the mobile station to the base station using the second wireless communication, the processor performs the transmission control by identifying an access category of a bearer by using an identifier of the bearer of the data transmitted to the base station and mapping information between the identifier and an access category in the second wireless communication, the mapping information being configured by Radio Resource Control (RRC), wherein the bearer has a correspondence relationship with a tunnel of a General Packet Radio System (GPRS) tunneling protocol (GTP), the GTP being used to transfer to PDCP layer the data when the base station and the mobile station are communicating via the second wireless communication.

12. A base station configured to perform data transmission between the base station and a mobile station using one of a first wireless communication and a second wireless communication different from the first wireless communication, the base station comprising:
a controller configured to control the first wireless communication and the second wireless communication; and
a processor configured to perform transmission control, wherein when data is transmitted from the base station to the mobile station using the second wireless communication, the processor performs transmission control by identifying an access category of a bearer by using an identifier of the bearer of the data transmitted to the mobile station and mapping information between the identifier and the access category in the second wireless communication, the mapping information being configured by Radio Resource Control (RRC), wherein the bearer has a correspondence relationship with a tunnel of a General Packet Radio System (GPRS) tunneling protocol (GTP), and wherein
the controller performs routing of the data by using a PDCP layer as a convergence point, and the GTP is used to transfer the data when the base station uses the second wireless communication to communicate with the mobile station.

13. The base station according to claim 12, wherein, the access category is voice, video, best effort or background.

* * * * *